United States Patent
Ogata et al.

(10) Patent No.: US 8,943,818 B2
(45) Date of Patent: Feb. 3, 2015

(54) HYDRAULIC DEVICE FOR STEPLESS TRANSMISSION

(75) Inventors: Yusuke Ogata, Toyota (JP); Koichi Tanaka, Okazaki (JP); Nobuaki Takahashi, Toyota (JP); Kenji Matsuo, Toyota (JP); Naofumi Nishida, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 812 days.

(21) Appl. No.: 13/256,526

(22) PCT Filed: May 13, 2009

(86) PCT No.: PCT/JP2009/058944
§ 371 (c)(1),
(2), (4) Date: Sep. 14, 2011

(87) PCT Pub. No.: WO2010/131345
PCT Pub. Date: Nov. 18, 2010

(65) Prior Publication Data
US 2012/0011841 A1    Jan. 19, 2012

(51) Int. Cl.
*F16D 31/02*   (2006.01)
*F16H 61/00*   (2006.01)
(Continued)

(52) U.S. Cl.
CPC ........ *F16H 61/0031* (2013.01); *F16H 61/0206* (2013.01); *F16H 61/66259* (2013.01); *F16H 2061/66286* (2013.01)
USPC .............................................. 60/421; 60/459

(58) Field of Classification Search
USPC .................... 60/421, 422, 429, 430, 456, 459
See application file for complete search history.

(56) References Cited

U.S. PATENT DOCUMENTS

2009/0229262 A1 *  9/2009  Pfister et al. ..................... 60/428
2010/0281859 A1 * 11/2010  Oka ................................ 60/459

FOREIGN PATENT DOCUMENTS

DE     103 18 152 A1    11/2004
JP     11-280643 A      10/1999
(Continued)

OTHER PUBLICATIONS

Extended European Search Report for corresponding EP Patent Application No. 09844619.8 dated Jan. 15, 2013.

*Primary Examiner* — Michael Leslie
(74) *Attorney, Agent, or Firm* — Sughrue Mion, PLLC

(57) ABSTRACT

A hydraulic device includes a switch-over valve 1140 provided at a section of a sub-passage 1105 located downstream of a location where a first bypass passage 1117 is connected and located upstream of a primary regulator 1110. The switch-over valve 1140 is switched between a blocked state, where supply of hydraulic oil to a section of the sub-passage 1105 located downstream of the switch-over valve 1140 is blocked, and a communication state, where supply of hydraulic oil to the section of the sub-passage 1105 located downstream of the switch-over valve 1140 is permitted. In the hydraulic device, when the switch-over valve 1140 is switched to the communication state, as a discharge performance of a main pump 1102 increases, a first check valve 1118 closes. Supply paths for hydraulic oil discharged from the sub-pump 1103 are automatically switched in accordance with the discharge performance of the main pump 1102. When the switch-over valve 1140 is switched to the blocked state, the first check valve 1118 opens and hydraulic oil discharged from the sub-pump 1103 is introduced into a main passage 1104.

26 Claims, 8 Drawing Sheets

(51) Int. Cl.
*F16H 61/02* (2006.01)
*F16H 61/662* (2006.01)

(56) References Cited

FOREIGN PATENT DOCUMENTS

| JP | 2000-046166 A | 2/2000 |
| JP | 2003-193819 A | 7/2003 |
| JP | 2004-316832 A | 11/2004 |
| JP | 2004-353694 A | 12/2004 |
| JP | 2004-353768 A | 12/2004 |
| JP | 2005-221047 A | 8/2005 |
| JP | 2006-038236 A | 2/2006 |
| JP | 2007-010090 A | 1/2007 |
| JP | 2008-157322 A | 7/2008 |
| WO | 2004/092618 A1 | 10/2004 |
| WO | 2007/074633 A1 | 7/2007 |
| WO | 2010/064307 A1 | 6/2010 |

* cited by examiner

HYDRAULIC DEVICE FOR STEPLESS TRANSMISSION

CROSS REFERENCE TO RELATED APPLICATIONS

This application is a National Stage of International Application No. PCT/JP2009/058944 filed on Mar. 13, 2009, the contents of all of which are incorporated herein by reference in their entirety.

FIELD OF THE INVENTION

The present invention relates to a hydraulic device for a stepless transmission.

BACKGROUND OF THE INVENTION

As a stepless transmission provided in an automobile or the like, there is known a belt type stepless transmission including a primary pulley to which drive force of an internal combustion engine is transmitted, and a secondary pulley connected to vehicle wheels. The winding radius of a belt that is wound around this pair of pulleys is changed, thereby continuously changing a transmission gear ratio in a stepless manner.

According to the belt type stepless transmission, the hydraulic pressure in a hydraulic chamber formed in each of the pulleys is changed to adjust the groove width of the pulley, thereby changing the winding radius of the belt, and controlling the transmission gear ratio. Hence, the belt type stepless transmission includes a hydraulic device that controls the hydraulic pressure of hydraulic oil that is supplied to the hydraulic chamber of each pulley. The hydraulic device includes an engine-driven oil pump that pumps the hydraulic oil utilizing drive force of the internal combustion engine. The hydraulic oil that is pumped by the engine-driven oil pump is supplied to the hydraulic chamber of each of the pulleys.

The discharge performance of the engine-driven oil pump changes as the engine rotational speed changes. Hence, when the engine rotational speed is low and the discharge performance is low, the discharge performance of the oil pump becomes insufficient and there is an adverse possibility that a necessary amount of hydraulic oil cannot be supplied to the hydraulic chamber of the pulley.

A hydraulic device described in Patent Document 1 includes a sub-pump in addition to a main pump. When the engine rotational speed is low, hydraulic oil is supplied from both the main pump and the sub-pump so that the necessary amount of hydraulic pressure is secured, and when the engine rotational speed is high, hydraulic oil discharged from the sub-pump is not supplied to the hydraulic chamber and is caused to return to an oil pan. If this configuration is employed, as the engine rotational speed increases, the discharge performance of the main pump increases. When it becomes possible to secure the necessary amount of hydraulic pressure only by hydraulic oil discharged from the main pump, the load on the sub-pump is reduced. It is possible to prevent hydraulic oil from being unnecessarily pumped by the sub-pump, and to prevent hydraulic pressure from becoming insufficient when the engine rotational speed is low.

As a specific configuration for a hydraulic device in which as the discharge performance of the main pump increases, supply paths for hydraulic oil discharged from the sub-pump are switched, it is possible to employ a configuration including a regulator 5 and a check valve 8 as shown in FIG. 9, for example.

As shown in FIG. 9, this hydraulic device includes a main pump 1 and a sub-pump 2 as engine-driven oil pumps. A main passage 3 is connected to the main pump 1, and hydraulic oil that is pumped from the main pump 1 is supplied to a speed-changing hydraulic pressure circuit through the main passage 3 and to a lubricating-hydraulic pressure circuit. A sub-passage 4 that is in communication with the lubricating-hydraulic pressure circuit is connected to the sub-pump 2. The speed-changing hydraulic pressure circuit supplies hydraulic oil to hydraulic chambers of the pulleys. The lubricating-hydraulic pressure circuit supplies hydraulic oil to various portions of the stepless transmission as lubricant oil.

The main passage 3 and the sub-passage 4 include the regulator 5. As shown in FIG. 9, the regulator 5 is provided at a section of the main passage 3 located downstream of a location X, where the speed-changing hydraulic pressure circuit is connected, and its spool valve is always biased in a direction closing the main passage 3 and the sub-passage 4 by a spring 5a. The regulator 5 includes a feedback passage 5b that causes the hydraulic pressure of hydraulic oil supplied to the speed-changing hydraulic pressure circuit to be applied to the spool valve. If the hydraulic pressure of the hydraulic oil supplied to the speed-changing hydraulic pressure circuit increases, a larger hydraulic pressure is applied to the spool valve, and the spool valve is displaced to its opening side against the biasing force of the spring 5a.

The regulator 5 includes a main port 5c through which hydraulic oil flowing through the main passage 3 passes, and a sub-port 5d through which hydraulic oil flowing through the sub-passage 4 passes. The shapes of the main port 5c and the sub-port 5d are set such that opening areas thereof with respect to the amount of displacement of the spool valve to its opening side change as shown in FIG. 10.

More specifically, when the amount of displacement of the spool valve is significantly small, the main port 5c and the sub-port 5d both close, and the regulator 5 prohibits hydraulic oil from flowing through the main passage 3 and the sub-passage 4. If the hydraulic pressure applied to the spool valve via the feedback passage 5b increases and the amount of displacement of the spool valve to its opening side increases, the opening area of the main port 5c first increases as shown with the solid line in FIG. 10, and the hydraulic oil flows to a section downstream of the regulator 5 through the main passage 3. When the hydraulic pressure applied to the spool valve via the feedback passage 5b further increases and the amount of displacement of the spool valve further increases, the opening area of the sub-port 5d starts increasing, and hydraulic oil flows to a section downstream of the regulator 5 not only through the main passage 3 but also through the sub-passage 4. As shown in FIG. 10, the greater the amount of displacement of the spool valve to its opening side is, the greater the opening areas of the main port 5c and the sub-port 5d are, and the amount of hydraulic oil supplied to the section downstream of the regulator 5 through the main passage 3 and the sub-passage 4 increases. At that time, when the amount of displacement is equal to or greater than a predetermined amount A, the opening area of the sub-port 5d is greater than that of the main port 5c, and the amount of hydraulic oil flowing through the sub-passage 4 via the sub-port 5d becomes greater than the amount of hydraulic oil flowing through the main passage 3 via the main port 5c.

A linear solenoid 6 that outputs a control hydraulic pressure is connected to the regulator 5. The control hydraulic pressure biases the spool valve to its closing side. By controlling the linear solenoid 6 to control the magnitude of the control hydraulic pressure that biases the spool valve to the closing side, it is possible to change the amount of displacement of the spool valve with respect to the magnitude of the hydraulic pressure applied to the spool valve via the feedback passage 5b, and to control the magnitude of the hydraulic pressure of hydraulic oil supplied to the speed-changing hydraulic pressure circuit.

Further, as shown in FIG. 9, a bypass passage 7 is provided at a section of the main passage 3 located upstream of the location X, where the speed-changing hydraulic pressure circuit is connected. The bypass passage 7 connects, with each other, the main passage 3 and a section of the sub-passage 4 located upstream of the regulator 5. The bypass passage 7 includes the check valve 8. The check valve 8 opens when the hydraulic pressure of hydraulic oil flowing through a section of the bypass passage 7 closer to the sub-passage 4 is greater than the hydraulic pressure of hydraulic oil flowing through a section of the bypass passage 7 closer to the main passage 3, and the check valve 8 permits only a flow of hydraulic oil from the sub-passage 4 to the main passage 3.

Immediately after the internal combustion engine is driven and the main pump 1 and the sub-pump 2 start pumping the hydraulic oil, the engine rotational speed is low. Thus, the hydraulic pressure supplied to the speed-changing hydraulic pressure circuit through the main passage 3 is significantly small. Hence, at that time, the hydraulic pressure applied to the spool valve of the regulator 5 via the feedback passage 5b is significantly small, and both the main port 5c and the sub-port 5d of the regulator 5 close. Therefore, the hydraulic oil discharged from the sub-pump 2 is not supplied to a section downstream of the regulator 5, and the hydraulic pressure in a section of the sub-passage 4 located upstream of the regulator 5 gradually increases. If the hydraulic pressure in a section of the sub-passage 4 located upstream of the regulator 5 becomes higher than the hydraulic pressure in a section of the main passage 3 located upstream of the location X, where the speed-changing hydraulic pressure circuit is connected, the check valve 8 opens and the hydraulic oil discharged from the sub-pump 2 through the bypass passage 7 flows into the main passage 3. As a result, both the hydraulic oil discharged from the main pump 1 and the hydraulic oil discharged from the sub-pump 2 are supplied to the speed-changing hydraulic pressure circuit through the main passage 3. If both the hydraulic oil discharged from the main pump 1 and the hydraulic oil discharged from the sub-pump 2 are supplied to the speed-changing hydraulic pressure circuit in this manner and the hydraulic pressure of the hydraulic oil supplied to the speed-changing hydraulic pressure circuit increases, the hydraulic pressure applied to the spool valve of the regulator 5 via the feedback passage 5b increases, and the main port 5c first opens. Both the hydraulic oil discharged from the main pump 1 and the hydraulic oil discharged from the sub-pump 2 are supplied to the lubricating-hydraulic pressure circuit through the main passage 3.

In the hydraulic device above, immediately after the internal combustion engine is driven and when the discharge performance of the main pump 1 is low, the check valve 8 opens, and both the hydraulic oil discharged from the main pump 1 and the hydraulic oil discharged from the sub-pump 2 are supplied to the hydraulic pressure circuits through the main passage 3.

If the engine rotational speed increases and the discharge performance of the main pump 1 and the sub-pump 2 increases, the hydraulic pressure applied to the spool valve via the feedback passage 5b of the regulator 5 increases, the amount of displacement of the spool valve increases. If the amount of displacement of the spool valve of the regulator 5 increases, the sub-port 5d opens as shown in FIG. 10, and hydraulic oil is supplied to a section of the sub-passage 4 located downstream of the regulator 5. As a result, the hydraulic pressure of hydraulic oil in a section of the bypass passage 7 located closer to the sub-passage 4 decreases. If the hydraulic pressure in that section becomes lower than the hydraulic pressure of hydraulic oil in the bypass passage 7 closer to the main passage 3, the check valve 8 closes. If the discharge performance of the main pump 1 increases and the check valve 8 closes, the hydraulic oil discharged from the sub-pump 2 is not supplied to the speed-changing hydraulic pressure circuit, and is supplied, through the sub-passage 4, to the lubricating-hydraulic pressure circuit located downstream of the regulator 5.

According to the hydraulic device for a stepless transmission including the regulator 5 and the check valve 8, when the hydraulic pressure of hydraulic oil discharged from the main pump 1 increases, the supply paths for hydraulic oil discharged from the sub-pump 2 are automatically switched. That is, according to this configuration, it is possible to automatically switch between the supply paths for hydraulic oil discharged from the sub-pump 2, and to change the load of the sub-pump without providing a sensor for monitoring the hydraulic pressure of hydraulic oil discharged from the main pump 1.

In the meantime, in the hydraulic device for a stepless transmission including the regulator 5 and the check valve 8, when the hydraulic pressure of hydraulic oil supplied to the speed-changing hydraulic pressure circuit is to be significantly increased, the linear solenoid 6 is controlled to increase the magnitude of a control hydraulic pressure that biases the spool valve of the regulator 5 to its closing side. The spool valve of the regulator 5 is displaced to the closing side, and the amount of hydraulic oil flowing through the sub-passage 4 via the main port 5c and the sub-port 5d decreases. As a result, the hydraulic pressure of hydraulic oil in a section of the sub-passage 4 located upstream of the regulator 5 increases, and the check valve 8 opens. Since the check valve 8 opens in this manner, the hydraulic oil discharged from the sub-pump 2 flows through the main passage 3 together with hydraulic oil discharged from the main pump 1, and it is possible to significantly increase the hydraulic pressure of hydraulic oil supplied to the speed-changing hydraulic pressure circuit.

In the hydraulic device above, since the check valve 8 is opened by operating the linear solenoid 6 to increase the hydraulic pressure in the sub-passage 4, it takes time until the check valve 8 opens and the hydraulic pressure increases after the linear solenoid 6 is operated. Hence, when it is required to quickly change the speed as in a case where abrupt acceleration is requested and the hydraulic pressure required by the speed-changing hydraulic pressure circuit abruptly increases, there is an adverse possibility that the hydraulic pressure will not be increased enough in time. The hydraulic pressure supplied to each of the pulleys becomes insufficient as the transmission gear ratio is changed, and slippage is generated on the belt.

Patent Document 1: Japanese Laid-open Patent Publication No. 2003-193819

SUMMARY OF THE INVENTION

It is an objective of the present invention to provide a hydraulic device for a stepless transmission that is capable of automatically switching between supply paths for hydraulic oil discharged from a sub-pump in accordance with the discharge performance of a main pump, and capable of swiftly increasing the hydraulic pressure of hydraulic oil supplied to a speed-changing hydraulic pressure circuit when the hydraulic pressure required by a speed-changing hydraulic pressure circuit increases.

To achieve the foregoing objective, the present invention provides a hydraulic device for a stepless transmission, comprising: an engine-driven main pump and an engine-driven sub-pump; a main passage connecting the main pump to a speed-changing hydraulic pressure circuit and to a lubricating-hydraulic pressure circuit; a sub-passage connecting the sub-pump to the lubricating-hydraulic pressure circuit; a regulator that opens when the hydraulic pressure of hydraulic oil supplied to the speed-changing hydraulic pressure circuit through the main passages increases, controls the amount of hydraulic oil supplied to the lubricating-hydraulic pressure circuit through the main passage and the sub-passage, and adjusts the hydraulic pressure of hydraulic oil supplied to the speed-changing hydraulic pressure circuit; a bypass passage connecting a section of the main passage located upstream of a location where the speed-changing hydraulic pressure circuit is connected and a section of the sub-passage located upstream of the regulator to each other; and a check valve that is provided in the bypass passage and permits only flow of hydraulic oil in a direction from the sub-passage toward the main passage. The check valve closes when the discharge performance of the main pump increases, and supply paths for hydraulic oil discharged from the sub-pump are automatically switched in accordance with the discharge performance of the main pump. In the hydraulic device, a switch-over valve is provided at a section of the sub-passage located downstream of a location where the bypass passage is connected and located upstream of the regulator, and the switch-over valve is switched between a blocked state, where supply of hydraulic oil to a section of the sub-passage located downstream of the switch-over valve is blocked, and a communication state, where supply of hydraulic oil to a section of the sub-passage located downstream of the switch-over valve is permitted.

According to this configuration, when the switch-over valve is in the communication state, the check valve opens or closes in accordance with the discharge performance of the main pump, so that supply paths for hydraulic oil discharged from the sub-pump are automatically switched. When the switch-over valve is in the blocked state on the other hand, the hydraulic pressure in a section of the sub-passage located upstream of the switch-over valve increases, and the check valve opens, so that hydraulic oil discharged from the sub-pump flows through the main passage together with hydraulic oil discharged from the main pump. That is, if the switch-over valve is brought into the blocked state, it is possible to quickly increase the hydraulic pressure on the side of the sub-passage of the check valve to open the check valve, and to introduce hydraulic oil discharged from the sub-pump into the main passage.

According to this configuration, it is also possible to operate the switch-over valve to open the check valve in advance before the regulator is operated to increase the hydraulic pressure of hydraulic oil supplied to the speed-changing hydraulic pressure circuit, and to introduce hydraulic oil discharged from the sub-pump into the main passage. Hence, when it is predicted that the hydraulic pressure required by the speed-changing hydraulic pressure circuit increases, the switch-over valve is previously operated and brought into the blocked state, hydraulic oil discharged from the sub-pump is introduced into the main passage. When the hydraulic pressure required by the speed-changing hydraulic pressure circuit increases, it is possible to quickly increase the hydraulic pressure of hydraulic oil supplied to the speed-changing hydraulic pressure circuit. That is, according to this configuration, it is possible to automatically switch between the supply paths for hydraulic oil discharged from the sub-pump in accordance with the discharge performance of the main pump. When the hydraulic pressure required by the speed-changing hydraulic pressure circuit increases, it is possible to quickly increase the hydraulic pressure of hydraulic oil supplied to the speed-changing hydraulic pressure circuit.

In order to predict that the hydraulic pressure required by the speed-changing hydraulic pressure circuit increases and to introduce hydraulic oil discharged from the sub-pump into the main passage in advance, it is preferable that the switch-over valve be brought into the blocked state when the operation of the accelerator operating member of the vehicle is released.

When the operation of the accelerator operating member is released, it is predicted that deceleration will be carried out. When the deceleration is being carried out, slippage is prone to be generated on the belt that is wound around the pulleys of the stepless transmission. It is therefore preferable that a high hydraulic pressure is supplied to the pulleys to increase the belt pinching pressure, thereby suppressing such slippage. According to one aspect of the invention, the switch-over valve is switched to the blocked state when operation of an accelerator operating member of a vehicle provided with the stepless transmission is cancelled. Hence, it is predicted that deceleration will be carried out when the operation of the accelerator operating member is released, and it is possible to introduce hydraulic oil discharged from the sub-pump into the main passage in advance. Accordingly, when deceleration is carried out and it becomes necessary to increase the belt pinching pressure and the hydraulic pressure required by the speed-changing hydraulic pressure circuit increases, it is possible to swiftly supply a necessary hydraulic pressure to suppress slippage of the belt.

According to one aspect of the invention, the switch-over valve is switched to the blocked state when a brake operating member of the vehicle provided with the stepless transmission is operated.

According to this configuration, the switch-over valve is operated and brought into the blocked state when the brake operating member is operated and the deceleration is carried out, and hydraulic oil discharged from the sub-pump is introduced into the main passage. Accordingly, the deceleration is carried out, and the hydraulic pressures supplied to the pulleys are increased. When it becomes necessary to increase the belt pinching pressure, the hydraulic pressure supplied to the speed-changing hydraulic pressure circuit is swiftly increased.

When abrupt acceleration is carried out, since it is necessary to transmit a large drive force through the stepless transmission and to quickly change speed, the hydraulic pressure required by the speed-changing hydraulic pressure circuit is abruptly increased. Hence, as one aspect of the invention, it is preferable that the switch-over valve be switched to the blocked state when the operation amount of the accelerator operating member of the vehicle provided with the stepless transmission becomes equal to or greater than a reference operation amount.

According to this configuration, it is determined that abrupt acceleration has been requested when the operation amount of the accelerator operating member is equal to or greater than the reference operation amount. Based on this, it is possible to introduce hydraulic oil discharged from the sub-pump into the main passage. Accordingly, when the abrupt acceleration is requested and swift speed-changing operation is required, it is possible to quickly increase the hydraulic pressure of hydraulic oil to be supplied to the speed-changing hydraulic pressure circuit.

As the speed-changing control mode, there is a stepless transmission having a sequential mode in which a driver can freely select one of a plurality of transmission gears having different transmission gear ratios. In such a stepless transmission, it is preferable that the switch-over valve be switched to the blocked state when the speed-changing control mode is switched to the sequential mode.

When the sequential mode is selected, it is necessary to quickly change the transmission gear ratio when the transmission gear is switched by the driver's shifting operation.

According to this configuration, when the speed-changing control mode is switched to the sequential mode, hydraulic oil discharged from the sub-pump is introduced into the main passage. Therefore, it is possible to quickly increase the hydraulic pressure of hydraulic oil to be supplied to the speed-changing hydraulic pressure circuit, and to realize the quick speed-changing operation.

As the speed-changing control mode, there is a stepless transmission having a normal mode and a sport mode in which the transmission gear ratio for the sport mode which is set greater than that of the normal mode, and in the sport mode, the effect of engine braking and an accelerating force greater than those of the normal mode can be obtained in which these modes can freely be switched. In such a stepless transmission, it is preferable that the switch-over valve be switched to the blocked state when the speed-changing control mode is switched to the sport mode.

When the sport mode is selected, it is assumed that a driver attempt to drive in a sporty manner, where he/she swiftly accelerates or decelerates. That is, when the sport mode is selected, it is predicted that abrupt acceleration or abrupt deceleration will be carried out based on the sport mode.

According to this configuration, when the speed-changing control mode is switched to the sport mode, hydraulic oil discharged from the sub-pump is introduced into the main passage. Therefore, when abrupt acceleration or abrupt deceleration is carried out, it is possible to quickly increase the hydraulic pressure of hydraulic oil to be supplied to the speed-changing hydraulic pressure circuit, to realize a quick speed-changing operation, and to suppress slippage of the belt.

When the brake operating member is operated and wheels are locked, rotation of the secondary pulley of the stepless transmission connected to the wheels suddenly stops. Therefore, a particularly large load is applied to the stepless transmission and the belt is prone to slip. According to one aspect of the invention on the other hand, the switch-over valve is switched to the blocked state when the brake operating member of the vehicle provided with the stepless transmission is operated and locking of the wheels is detected.

According to this configuration, when the brake operating member is operated and locking of the wheels is detected, it is possible to quickly increase the hydraulic pressure of hydraulic oil to be supplied to the speed-changing hydraulic pressure circuit, to increase hydraulic pressures of hydraulic oil to be supplied to the pulleys to increase the belt pinching pressure, and to suppress the slippage of the belt.

According to one aspect of the invention, the stepless transmission further includes a forward/reverse switching mechanism having a clutch, and a lockup clutch. The hydraulic device further comprises: a clutch-apply control valve that switches between supply paths for hydraulic oil supplied to the clutch of the forward/reverse switching mechanism; a first solenoid that outputs a control hydraulic pressure for driving the clutch-apply control valve to a garage operating position; a lockup relay valve that switches between supply paths for hydraulic oil supplied to the lockup clutch; and a second solenoid that outputs a control hydraulic pressure for driving the lockup relay valve to a lockup engaging operating position. A control hydraulic pressure that is output from the second solenoid is input to the clutch-apply control valve so that when a control hydraulic pressure is output from the second solenoid, the clutch-apply control valve is not displaced to the garage operating position even if a control hydraulic pressure is output from the first solenoid. Both a control hydraulic pressure that is output from the first solenoid and a control hydraulic pressure that is output from the second solenoid are input to the switch-over valve. The switch-over valve is switched to the communication state when control hydraulic pressures are output from both the first solenoid and the second solenoid, and the switch-over valve is switched to the blocked state when the control hydraulic pressure is not output from the first solenoid.

According to this configuration, it is unnecessary to provide an additional solenoid for operating the switch-over valve, and the switch-over valve can be operated utilizing the first solenoid provided for operating the clutch-apply control valve and the second solenoid provided for operating the lockup relay valve.

According to one aspect of the invention, the hydraulic device further comprises a first linear solenoid that outputs a control hydraulic pressure for controlling a belt pinching pressure of the stepless transmission. As a control hydraulic pressure that is output from the first linear solenoid increases, the belt pinching pressure increases. The switch-over valve is driven such that the switch-over valve is switched to the blocked state by a control hydraulic pressure that is output from the first linear solenoid.

According to this configuration, if a control hydraulic pressure that is output from the first linear solenoid is increased to increase the belt pinching pressure, the switch-over valve is driven such that it is brought into the blocked state, and the check valve opens. When the hydraulic pressure required by the speed-changing hydraulic pressure circuit is increased to increase the belt pinching pressure, it is possible to supply hydraulic oil discharged from the sub-pump to the speed-changing hydraulic pressure circuit through the main passage.

An example of the first linear solenoid the hydraulic pressure of which is increased when the belt pinching pressure is increased is a belt pinching pressure controlling-linear solenoid that outputs a control hydraulic pressure for biasing the pressure modulator to its opening side. The pressure modulator controls the hydraulic pressure of hydraulic oil to be supplied to the secondary pulley that adjusts the belt pinching pressure. Another example of the first linear solenoid is a line pressure controlling-linear solenoid that outputs a control hydraulic pressure for biasing the regulator to its closing side.

When abrupt acceleration or abrupt deceleration is carried out, the transmission gear ratio is prone to be increased. Hence, when the transmission gear ratio is large, it is assumed that abrupt acceleration or abrupt deceleration is carried out based on this fact and that the belt of the stepless transmission is prone to slip. Hence, it is also possible to employ such a configuration that the switch-over valve can be operated and brought into the blocked state under the condition that the transmission gear ratio is large.

As such a configuration, according to one aspect of the invention, the hydraulic pressure of hydraulic oil supplied to the primary pulley of the stepless transmission is applied to the switch-over valve such that the switch-over valve is driven in a direction opposite to a direction in which the switch-over valve is driven by a control hydraulic pressure that is output from the first linear solenoid.

In the belt type stepless transmission, the hydraulic pressure of hydraulic oil to be supplied to the primary pulley is increased when the transmission gear ratio is reduced, and the winding radius of the belt around the primary pulley is increased. Hence, according to this configuration, when the transmission gear ratio is small, hydraulic oil to be supplied to the primary pulley is increased, and the switch-over valve is driven in the direction opposite to the direction in which the switch-over valve is driven by a control hydraulic pressure that is output from the first linear solenoid. That is, when the transmission gear ratio is small, the switch-over valve is less prone to be brought into the blocked state even if the control hydraulic pressure that is output from the liner solenoid is increased.

When the transmission gear ratio is large, the hydraulic pressure of hydraulic oil to be supplied to the primary pulley is reduced. When the hydraulic pressure of hydraulic oil that is output from the first linear solenoid is increased, the switch-over valve is prone to be brought into the blocked state. That is, according to this configuration, it is possible to realize such a configuration that the switch-over valve can be operated and brought into the blocked state under the condition that the transmission gear ratio is large.

According to one aspect of the invention, the hydraulic device further comprises a speed-changing controlling-linear solenoid that outputs a control hydraulic pressure for controlling the hydraulic pressure of hydraulic oil supplied to the primary pulley of the stepless transmission. A control hydraulic pressure that is output from the speed-changing controlling-linear solenoid is applied to the switch-over valve such that the switch-over valve is driven in a direction opposite to a direction in which the switch-over valve is driven by a control hydraulic pressure that is output from the first linear solenoid. Even if this configuration is employed, it is possible to realize such a configuration that the switch-over valve can be operated and brought into the blocked state under the condition that the transmission gear ratio is large like the previous configuration.

Instead of employing the configuration in which the switch-over valve blocks the supply of hydraulic oil to a section of the sub-passage located downstream of the switch-over valve, it is also possible to employ such a configuration such that a section of the sub-passage located downstream of the switch-over valve is brought into communication with a section of the main passage located upstream of a section where the speed-changing hydraulic pressure circuit is connected. According to this configuration also, it is possible to introduce hydraulic oil discharged from the sub-pump into the main passage by operating the switch-over valve.

Hence, according to one aspect of the invention, a switch-over valve is provided at a section of the sub-passage located downstream of a location where the bypass passage is connected and located upstream of the regulator. The switch-over valve is switched between a first state, where a section of the sub-passage located upstream of the switch-over valve is brought into communication with a section of the main passage located upstream of a location where the speed-changing hydraulic pressure circuit is connected, and a second state, where the section of the sub-passage located upstream of the switch-over valve is brought into communication with a section of the sub-passage located downstream of the switch-over valve.

According to this configuration, when the switch-over valve is in the second state, the check valve opens or closes in accordance with the discharge performance of the main pump, and the supply paths for hydraulic oil discharged from the sub-pump are automatically switched. When the switch-over valve is in the first state on the other hand, hydraulic oil discharged from the sub-pump flows through the main passage together with hydraulic oil discharged from the main pump. That is, by bringing the switch-over valve into the first state, hydraulic oil discharged from the sub-pump can directly be introduced into the main passage through the switch-over valve.

According to this configuration, before the hydraulic pressure of hydraulic oil to be supplied to the speed-changing hydraulic pressure circuit is increased by operating the regulator, it is possible to operate the switch-over valve and bring it into the first state in advance, and to introduce hydraulic oil discharged from the sub-pump into the main passage. Therefore, when it is predicted that the hydraulic pressure required by the speed-changing hydraulic pressure circuit increases, it is possible to operate and bring the switch-over valve into the first stage to introduce hydraulic oil discharged from the sub-pump into the main passage in advance, the regulator can be operated when the hydraulic pressure required by the speed-changing hydraulic pressure circuit increases, and it is possible to quickly increase the hydraulic pressure of hydraulic oil to be supplied to the speed-changing hydraulic pressure circuit. That is, according to this configuration, the supply paths for hydraulic oil discharged from the sub-pump can automatically be switched in accordance with the discharge performance of the main pump. When the hydraulic pressure required by the speed-changing hydraulic pressure circuit increases, it is possible to quickly increase the hydraulic pressure of hydraulic oil to be supplied to the speed-changing hydraulic pressure circuit.

DETAILED DESCRIPTION OF THE PREFERRED EMBODIMENTS

Figure 1:
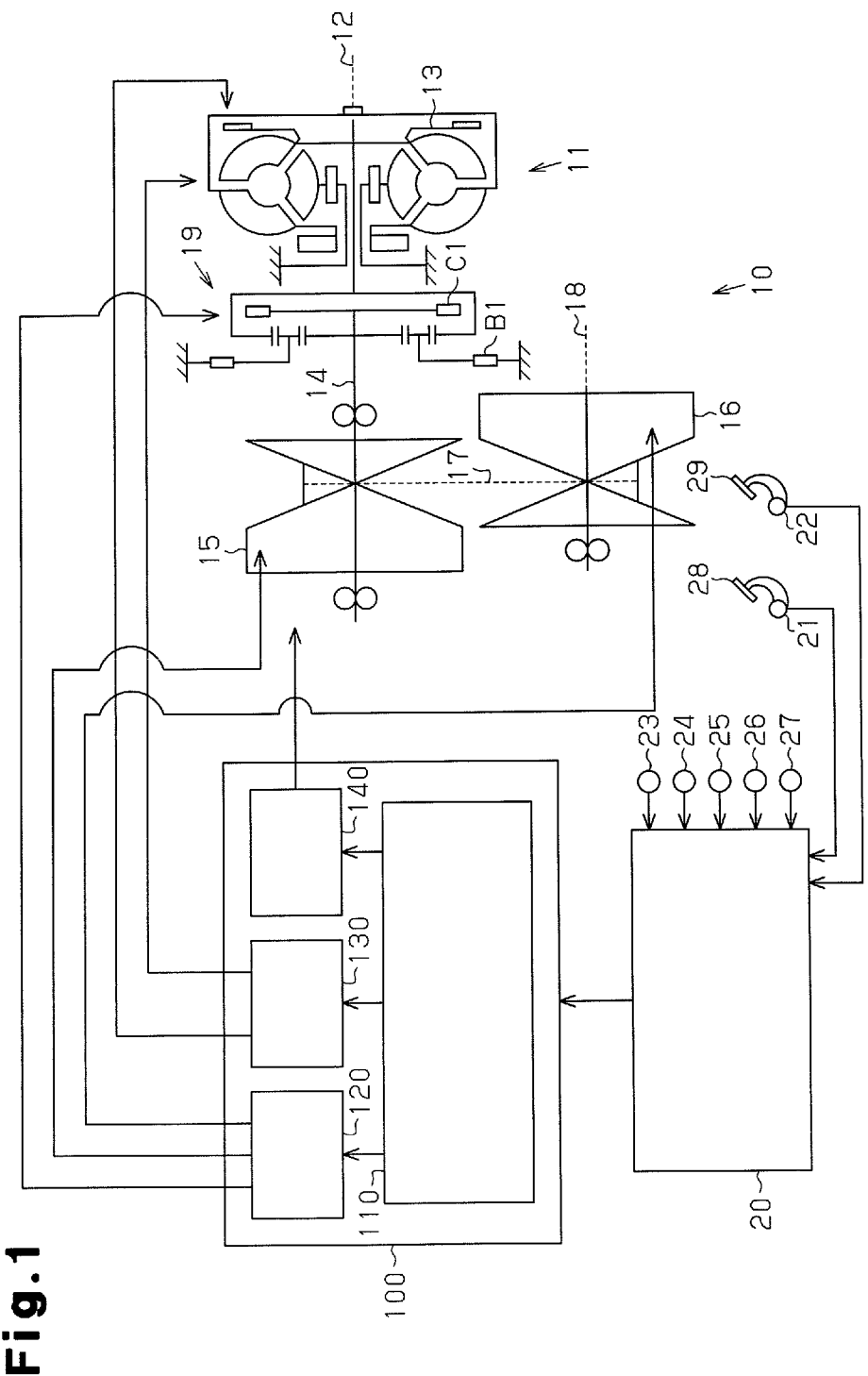
FIG. 1 is a schematic diagram showing the outline configuration of a stepless transmission having a hydraulic device according to one embodiment.

A specific embodiment of a hydraulic device for a stepless transmission mounted in an automobile according to the present invention will be described with reference to FIGS. 1 to 3. FIG. 1 is a schematic diagram of a stepless transmission including the hydraulic device according to the embodiment.

As shown in FIG. 1, a stepless transmission 10 according to the embodiment includes a torque converter 11 and a forward/reverse switching mechanism 19. An input shaft 12 of the torque converter 11 is connected to an output shaft of an internal combustion engine (not shown). The torque converter 11 includes a lockup clutch 13.

An output shaft of the torque converter 11 is connected to an input shaft of the forward/reverse switching mechanism 19. As shown in FIG. 1, the forward/reverse switching mechanism 19 includes a forward clutch C1 and a reverse brake B1 as clutches. By selectively engaging either one of the forward clutch C1 and the reverse brake B1, it is possible to switch between a state where an input rotation force is output as it is and a state where the input rotation force is reversed and it is output as a rotation force in the opposite direction.

An output shaft 14 of the forward/reverse switching mechanism 19 is connected to a primary pulley 15 of the stepless transmission 10. As shown in FIG. 1, the primary pulley 15 and a secondary pulley 16 of the stepless transmission 10 are connected with each other through a metallic belt 17 that is wound around these pulleys 15 and 16. An output shaft 18 connected to the secondary pulley 16 is connected to drive wheels through a reduction gear and a differential (neither is shown).

In the stepless transmission 10 of the embodiment, drive force of the internal combustion engine is transmitted to the primary pulley 15 through the torque converter 11 and the forward/reverse switching mechanism 19. A drive force transmitted from the primary pulley 15 to the secondary pulley 16 through the belt 17 is transmitted to the drive wheels through the reduction gear and the differential.

A hydraulic chamber (not shown) is formed in each of the primary pulley 15 and the secondary pulley 16, and the hydraulic pressure in the hydraulic chamber is changed by the hydraulic device 100. If the hydraulic pressures in the hydraulic chambers of the pulleys 15 and 16 are changed, groove widths of the pulleys 15 and 16, around which the belt 17 is wound, are changed, and the winding radius of the belt 17 around the pulleys 15 and 16 is changed. By changing the winding radius of the belt 17, the transmission gear ratio in the stepless transmission 10 is changed.

As shown in FIG. 1, the hydraulic device 100 includes a speed-changing hydraulic pressure circuit 120. The speed-changing hydraulic pressure circuit 120 controls the amount of hydraulic oil to be supplied to the hydraulic chambers of the pulleys 15 and 16, thereby changing the transmission gear ratio, and controls the amount of hydraulic oil to be supplied to the forward clutch C1 and the reverse brake B1 of the forward/reverse switching mechanism 19, thereby operating the forward/reverse switching mechanism 19. The hydraulic device 100 includes a torque converter-hydraulic pressure circuit 130. The torque converter-hydraulic pressure circuit 130 supplies hydraulic oil to the torque converter 11, controls the amount of hydraulic oil to be supplied to the lockup clutch 13, and operates the lockup clutch 13. The hydraulic device 100 also includes a lubricating-hydraulic pressure circuit 140 that supplies hydraulic oil to various portions of the stepless transmission 10 as lubricant oil. The hydraulic device 100 further includes the hydraulic pressure supplying circuit 110 that supplies hydraulic oil to the hydraulic pressure circuits 120, 130 and 140.

The hydraulic device 100 is controlled by an electronic controller 20. The electronic controller 20 includes a CPU that executes computational processing concerning various kinds of controls, a ROM in which programs and data required for the control are stored, a RAM in which results of computations of the CPU are temporarily stored, and others. Connected to the electronic controller 20 are an accelerator position sensor 21 that detects a driver's operation amount of an accelerator pedal 28 (accelerator operating member), a brake switch 22 that detects that a brake pedal 29 (brake operating member) is depressed, a vehicle speed sensor 23 that detects a vehicle speed, a wheel speed sensor 24 that detects the rotational speed of each of the wheels, and a rotational speed sensor 25 that detects an engine rotational speed. A sequential mode switch 26 and a sport mode switch 27 are connected to the electronic controller 20 as switches for switching between speed-changing control modes of the stepless transmission 10. The electronic controller 20 executes various computations based on signals obtained from these various sensors and switches, and outputs a control command to the hydraulic device 100 to control the lockup clutch 13 of the stepless transmission 10, the transmission gear ratio and the forward/reverse switching mechanism 19.

The configuration of the hydraulic device 100 will be described in detail with reference to FIG. 2. FIG. 2 is a schematic diagram showing an outline configuration of the hydraulic device 100 according to the embodiment.

Figure 2:
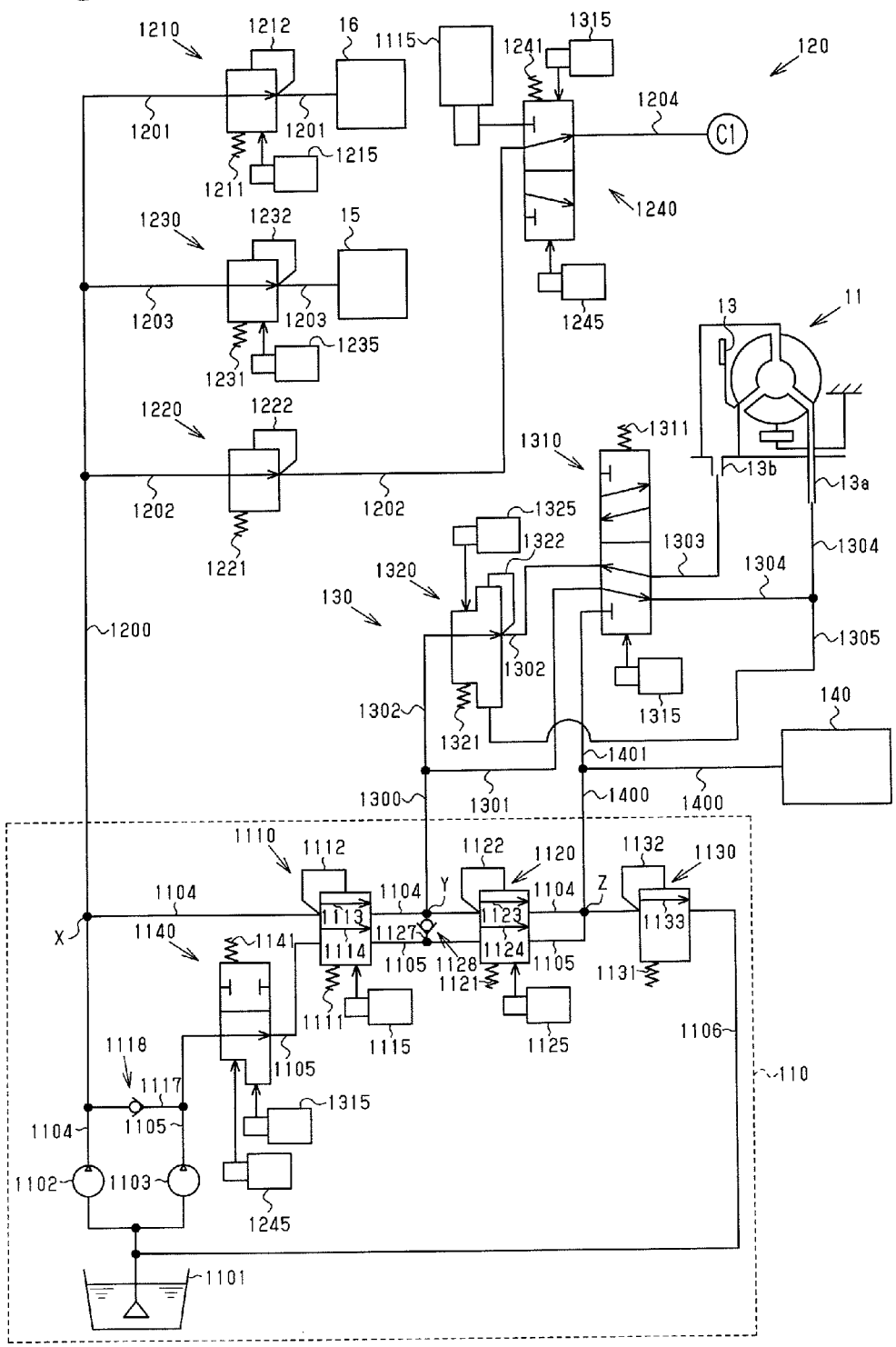
FIG. 2 is a schematic diagram showing the configuration of the hydraulic device of the embodiment.

As shown in a lower part of FIG. 2, the hydraulic pressure supplying circuit 110 includes an engine-driven main pump 1102 and an engine-driven sub-pump 1103 that are driven by drive force from the internal combustion engine for pumping hydraulic oil stored in an oil pan 1101.

A main passage 1104 is connected to the main pump 1102. Hydraulic oil that is pumped from the main pump 1102 is supplied to a speed-changing hydraulic pressure circuit 120, a torque converter-hydraulic pressure circuit 130 and a lubricating-hydraulic pressure circuit 140 through the main passage 1104. A sub-passage 1105 that is in communication with the lubricating-hydraulic pressure circuit 140 is connected to the sub-pump 1103.

As shown in FIG. 2, the main passage 1104 and the sub-passage 1105 include a primary regulator 1110 and a secondary regulator 1120.

The primary regulator 1110 is provided at a section of the main passage 1104 located downstream of a location X, where the speed-changing hydraulic pressure circuit 120 is connected, and at the section of the main passage 1104 located upstream of a location Y, where the torque converter-hydraulic pressure circuit 130 is connected. Its spool valve is always biased by a spring 1111 in a direction closing the main passage 1104 and the sub-passage 1105. The primary regulator 1110 is provided with a feedback passage 1112 that causes the hydraulic pressure of hydraulic oil supplied to the speed-changing hydraulic pressure circuit to be applied to the spool valve. As the hydraulic pressure of the hydraulic oil supplied to the speed-changing hydraulic pressure circuit 120 becomes higher, a higher hydraulic pressure is applied to the spool valve via the feedback passage 1112, and the spool valve is displaced to the opening side against the biasing force of the spring 1111.

The primary regulator 1110 is provided with a main port 1113 through which hydraulic oil flowing via the main passage 1104 passes and a sub-port 1114 through which hydraulic oil flowing via the sub-passage 1105 passes. The shapes of the main port 1113 and the sub-port 1114 are set such that opening areas thereof with respect to the amount of displacement of the spool valve to its opening side are changed as shown in FIG. 3. More specifically, when the amount of displacement of the spool valve is significantly small, both the main port 1113 and the sub-port 1114 are closed, and the primary regulator 1110 prohibits hydraulic oil from flowing through the main passage 1104 and the sub-passage 1105. Then, if the hydraulic pressure applied to the spool valve via the feedback passage 1112 increases and the amount of displacement of the spool valve to its opening side increases, the opening area of the main port 1113 increases as shown with a solid line in FIG. 3, and the hydraulic oil flows to a section downstream of the primary regulator 1110 through the main passage 1104. If the hydraulic pressure applied to the spool valve via the feedback passage 1112 further increases and the amount of displacement of the spool valve further increases, the opening area of the sub-port 1114 starts increasing, and the hydraulic oil flows to a section downstream of the primary regulator 1110 not only through the main passage 1104 but also through the sub-passage 1105.

Figure 3:
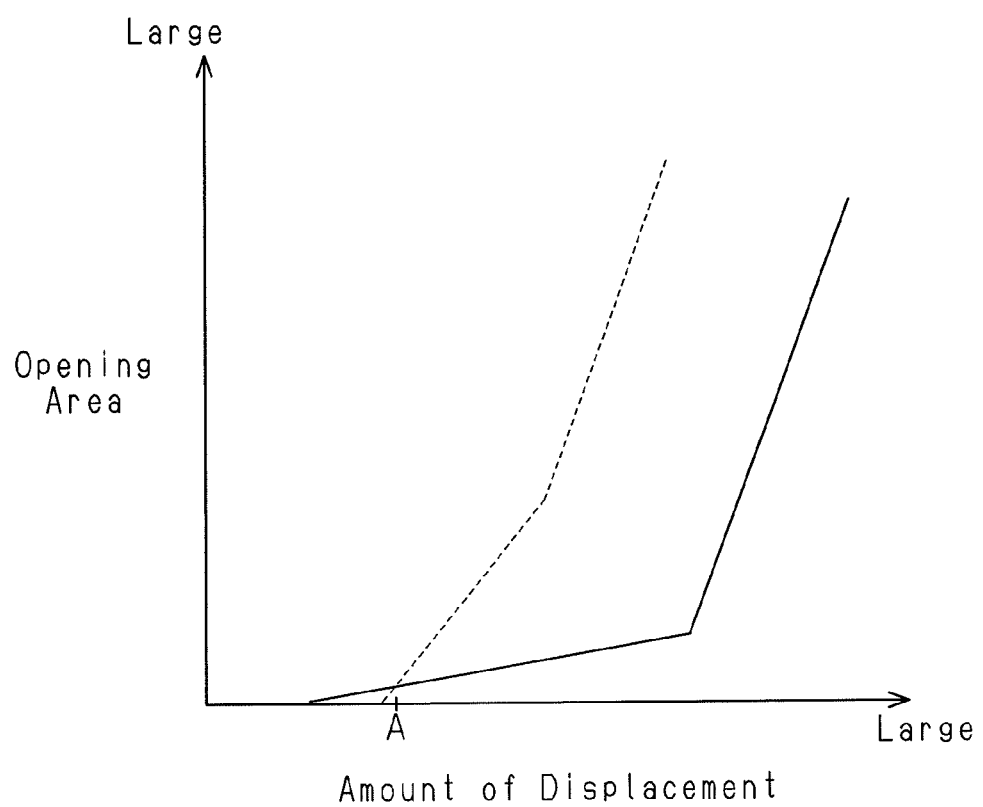
FIG. 3 is a graph showing the relationship between the amount of displacement of a spool valve and opening areas of a main port and a sub-port.

As shown in FIG. 3, the greater the amount of displacement of the spool valve to its opening side becomes, the larger the opening areas of the main port 1113 and the sub-port 1114 become. Accordingly, the amount of hydraulic oil supplied to a section downstream of the primary regulator 1110 through the main passage 1104 and the sub-passage 1105 increases. At that time, when the amount of displacement is equal to or greater than a predetermined amount A, the opening area of the sub-port 1114 becomes greater than that of the main port 1113, and the amount of hydraulic oil flowing through the sub-passage 1105 via the sub-port 1114 becomes greater than the amount of hydraulic oil flowing through the main passage 1104 via the main port 1113.

The primary regulator 1110 is provided with a line pressure controlling-linear solenoid 1115 that outputs a control hydraulic pressure for biasing the spool valve to its closing side. By controlling the magnitude of the control hydraulic pressure by the line pressure controlling-linear solenoid 1115, the amount of displacement of the spool valve with respect to the magnitude of the hydraulic pressure applied via the feedback passage 1112 is changed, and it is possible to control the magnitude of the hydraulic pressure of hydraulic oil supplied to the speed-changing hydraulic pressure circuit 120. The control of the hydraulic pressure by the line pressure controlling-linear solenoid 1115 is executed by the electronic controller 20.

As shown in FIG. 2, the secondary regulator 1120 is provided at a section of the main passage 1104 located downstream of the location Y, where the torque converter-hydraulic pressure circuit 130 is connected, and at the section of the main passage 1104 located upstream of a location Z, where the lubricating-hydraulic pressure circuit 140 is connected. The spool valve is always biased by a spring 1121 in a direction closing the main passage 1104 and the sub-passage 1105. The secondary regulator 1120 is provided with a feedback passage 1122 that causes the hydraulic pressure of hydraulic oil supplied to the torque converter-hydraulic pressure circuit 130 to be applied to the spool valve. As the hydraulic pressure of hydraulic oil supplied to the torque converter-hydraulic pressure circuit 130 increases, a higher hydraulic pressure is applied to the spool valve via the feedback passage 1122, and the spool valve is displaced to its opening side against the biasing force of the spring 1121.

Similar to the primary regulator 1110, the secondary regulator 1120 is also provided with a main port 1123 through which hydraulic oil flowing via the main passage 1104 passes, and a sub-port 1124 through which hydraulic oil flowing via the sub-passage 1105 passes. Similar to the primary regulator 1110, the shapes of the main port 1123 and the sub-port 1124 are set such that opening areas thereof with respect to the amount of displacement of the spool valve to its opening side are changed as shown in FIG. 3.

The secondary regulator 1120 is provided with a lockup pressure controlling-linear solenoid 1125 that outputs a control hydraulic pressure for biasing the spool valve to its closing side. By controlling the magnitude of the control hydraulic pressure by the lockup pressure controlling-linear solenoid 1125, the amount of displacement of the spool valve with respect to the magnitude of the hydraulic pressure applied via the feedback passage 1122 is changed, and it is possible to control the magnitude of the hydraulic pressure of hydraulic oil supplied to the torque converter-hydraulic pressure circuit 130. The control of the hydraulic pressure by the lockup pressure controlling-linear solenoid 1125 is executed by the electronic controller 20.

As shown in FIG. 2, the main passage 1104 and the sub-passage 1105 merge with each other at the location Z downstream of the secondary regulator 1120, and hydraulic oil flowing through a section downstream of the secondary regulator 1120 through the main passage 1104 and the sub-passage 1105 is supplied to the lubricating-hydraulic pressure circuit 140.

A lubrication regulator 1130 including a drain port 1133 is connected to the location Z, where the main passage 1104 and the sub-passage 1105 merge with each other. A spool valve of the lubrication regulator 1130 is always biased to its closing side by a spring 1131. The lubrication regulator 1130 is provided with a feedback passage 1132 that supplies, to the spool valve, the hydraulic pressure of hydraulic oil supplied to the lubricating-hydraulic pressure circuit 140. As the hydraulic pressure of hydraulic oil supplied to the lubricating-hydraulic pressure circuit 140 increases, a greater hydraulic pressure is applied to the spool valve via the feedback passage 1132, the spool valve is displaced to its opening side against the biasing force of the spring 1131, and the opening area of the drain port 1133 increases. A drain passage 1106 is connected to the drain port 1133 of the lubrication regulator 1130. Hydraulic oil returns to the upstream of the main pump 1102 and the sub-pump 1103 through the drain passage 1106. Since the spool valve is displaced to its opening side, hydraulic oil returns through the drain passage 1106.

As shown in FIG. 2, a first bypass passage 1117 is provided at a section of the main passage 1104 located upstream of the location X, where the speed-changing hydraulic pressure circuit 120 is connected. The main passage 1104 and a section of the sub-passage 1105 located upstream of the primary regulator 1110 are in communication with each other through the first bypass passage 1117. The first bypass passage 1117 is provided with a first check valve 1118. The first check valve 1118 opens when the hydraulic pressure of hydraulic oil flowing through a section of the first bypass passage 1117 closer to the sub-passage 1105 is greater than the hydraulic pressure of hydraulic oil flowing through a section of the first bypass passage 1117 closer to the main passage 1104. The first check valve 1118 permits only flow of hydraulic oil from the sub-passage 1105 to the main passage 1104.

A second bypass passage 1127 is provided at the location Y of the main passage 1104, where the torque converter-hydraulic pressure circuit 130 is connected. The main passage 1104 and a section of the sub-passage 1105 located downstream of the primary regulator 1110 and upstream of the secondary regulator 1120 are in communication with each other through the second bypass passage 1127. The second bypass passage 1127 is provided with a second check valve 1128. The second check valve 1128 opens when the hydraulic pressure of hydraulic oil flowing through a section of the second bypass passage 1127 closer to the sub-passage 1105 is greater than the hydraulic pressure of hydraulic oil flowing through a section of the second bypass passage 1127 closer to the main passage 1104. The second check valve 1128 permits only a flow of hydraulic oil from the sub-passage 1105 to the main passage 1104.

As shown in an upper part of FIG. 2, the speed-changing hydraulic pressure circuit 120 is connected to the location X of the main passage 1104 of the hydraulic pressure supplying circuit 110 through a line pressure passage 1200. The line pressure passage 1200 branches into a first line pressure passage 1201, a second line pressure passage 1202 and a third line pressure passage 1203.

The first line pressure passage 1201 is connected to the hydraulic chamber of the secondary pulley 16, and hydraulic oil is supplied to the hydraulic chamber of the secondary pulley 16 through the first line pressure passage 1201. As shown in FIG. 2, a first line pressure modulator 1210 is provided at an intermediate section of the first line pressure passage 1201. A spool valve of the first line pressure modulator 1210 is always biased to its opening side by a spring 1211. The first line pressure modulator 1210 is provided with a feedback passage 1212 that causes the hydraulic pressure of hydraulic oil supplied to the secondary pulley 16 to act on the spool valve. As the hydraulic pressure of hydraulic oil supplied to the secondary pulley 16 increases, a greater hydraulic pressure is applied to the spool valve via the feedback passage 1212, and the spool valve is displaced to its closing side against the biasing force of the spring 1211. As a result, the amount of hydraulic oil supplied to the secondary pulley 16 through the first line pressure modulator 1210 is reduced.

The first line pressure modulator 1210 is provided with a belt pinching pressure controlling-linear solenoid 1215 that outputs a control hydraulic pressure for biasing the spool valve to its opening side. The belt pinching pressure controlling-linear solenoid 1215 controls magnitude of the control hydraulic pressure, the amount of displacement of the spool valve with respect to the magnitude of the hydraulic pressure applied via the feedback passage 1212, and it is possible to control the hydraulic pressure of hydraulic oil to be supplied to the hydraulic chamber of the secondary pulley 16.

More specifically, as the control hydraulic pressure that is output from the belt pinching pressure controlling-linear solenoid 1215 increases, the spool valve is less prone to be displaced to the closing side even if the hydraulic pressure applied via the feedback passage 1212 increases, and the hydraulic pressure of hydraulic oil supplied to the hydraulic chamber of the secondary pulley 16 increases.

As shown in the upper portion of FIG. 2, the second line pressure passage 1202 is connected to a clutch-apply control valve 1240 that is connected to the forward clutch C1 through the clutch passage 1204. A control hydraulic pressure of the line pressure controlling-linear solenoid 1115 is input to the clutch-apply control valve 1240.

By displacing the spool valve in position, the clutch-apply control valve 1240 switches between a state where the hydraulic pressure caused by hydraulic oil supplied through the second line pressure passage 1202 is supplied to the forward clutch C1 and a state where a control hydraulic pressure that is output from the line pressure controlling-linear solenoid 1115 is supplied to the forward clutch C1.

As shown in FIG. 2, the clutch-apply control valve 1240 is provided with a spring 1241 that biases the spool valve so as to displace the spool valve toward a normal operation position where hydraulic oil supplied through the second line pressure passage 1202 is supplied to the forward clutch C1. The clutch-apply control valve 1240 is provided with a first solenoid 1245 that drives the spool valve against the biasing force of the spring 1241, and that displaces the spool valve to a garage operating position where a control hydraulic pressure that is output from the line pressure controlling-linear solenoid 1115 is supplied to the forward clutch C1.

In the hydraulic device 100 of the embodiment, a control hydraulic pressure is output from the first solenoid 1245 immediately after the shift lever of the stepless transmission 10 is operated from the parking position "P" or the neutral position "N" to the forward drive position "D". A garage operation is executed to displace the spool valve of the clutch-apply control valve 1240 to the garage operating position and to gradually engage the forward clutch C1 by a control hydraulic pressure that is output from the line pressure controlling-linear solenoid 1115. After the forward clutch C1 is completely engaged, output of the control hydraulic pressure from the first solenoid 1245 is stopped, the spool valve is displaced to the normal operating position, and the forward clutch C1 is held in its engaged state by the hydraulic pressure of hydraulic oil supplied through the second line pressure passage 1202. A second line pressure modulator 1220 including a feedback passage 1222 and a spring 1221 is provided at an intermediate section of the second line pressure passage 1202. The second line pressure modulator 1220 adjusts such that the hydraulic pressure of hydraulic oil supplied to the forward clutch C1 through the second line pressure passage 1202 does not excessively increase.

In the hydraulic device 100 of the embodiment, a control hydraulic pressure of a second solenoid 1315, which will be described below, is input such that the spool valve is driven in a direction opposite to a direction in which the spool valve is driven by a control hydraulic pressure that is input from the first solenoid 1245 of the clutch-apply control valve 1240. In the hydraulic device 100 of the embodiment, when the control hydraulic pressure is input from the second solenoid 1315, the spool valve of the clutch-apply control valve 1240 is not displaced to the garage operating position even if the control hydraulic pressure is input from the first solenoid 1245.

The third line pressure passage 1203 is connected to the hydraulic chamber of the primary pulley 15, and supplies hydraulic oil to the hydraulic chamber of the primary pulley 15. A third line pressure modulator 1230 is provided at an intermediate section of the third line pressure passage 1203. A spool valve of the third line pressure modulator 1230 is always biased to its opening side by a spring 1231. The third line pressure modulator 1230 is provided with a feedback passage 1232 that causes the hydraulic pressure of hydraulic oil supplied to the primary pulley 15 to be applied to the spool valve. As the hydraulic pressure of hydraulic oil supplied to the primary pulley 15 increases, a greater hydraulic pressure is applied to the spool valve via the feedback passage 1232, and the spool valve is displaced to its closing side against the biasing force of the spring 1231. As a result, the amount of hydraulic oil supplied to the primary pulley 15 through the third line pressure modulator 1230 is reduced.

The third line pressure modulator 1230 is provided with a speed-changing controlling-linear solenoid 1235 that outputs a control hydraulic pressure for biasing the spool valve to the opening side. By controlling the magnitude of a control hydraulic pressure by means of the speed-changing controlling-linear solenoid 1235, it is possible to change the amount of displacement of the spool valve with respect to the magnitude of hydraulic pressure applied via the feedback passage 1232, and to control the hydraulic pressure of hydraulic oil supplied to the hydraulic chamber of the primary pulley 15.

More specifically, as the control hydraulic pressure that is output from the speed-changing controlling-linear solenoid 1235 increases, the spool valve is less prone to be displaced to its closing side even if the hydraulic pressure applied via the feedback passage 1232 increases. Accordingly, the hydraulic pressure of hydraulic oil supplied to the hydraulic chamber of the primary pulley 15 increases.

As shown in a central portion of FIG. 2, the torque converter-hydraulic pressure circuit 130 is connected to the location Y of the main passage 1104 of the hydraulic pressure supplying circuit 110 through a lockup passage 1300.

As shown in FIG. 2, the lockup passage 1300 branches into a supply passage 1301 and an engaging discharge passage 1302. The supply passage 1301 and the engaging discharge passage 1302 are connected to a lockup relay valve 1310.

A first passage 1304 is in communication with a first port 13a through which hydraulic oil is supplied to the lockup clutch 13 of the torque converter 11. A second passage 1303 is in communication with a second port 13b. The first passage 1304 and the second passage 1303 are connected to the lockup relay valve 1310. An opening-discharge passage 1401 that is in communication with a lubricating-hydraulic pressure passage 1400, which will be described blow, is also connected to the lockup relay valve 1310.

A control hydraulic pressure that is output from the second solenoid 1315 is input to the lockup relay valve 1310. The lockup relay valve 1310 switches between supply paths of hydraulic oil supplied to the lockup clutch 13 based on a control hydraulic pressure that is output from the second solenoid 1315.

More specifically, the spool valve of the lockup relay valve 1310 is always biased toward a lockup releasing operating position where the supply passage 1301 and the second passage 1303 are connected to each other, and the first passage 1304 and the opening-discharge passage 1401 are connected to each other by the biasing force of a spring 1311.

Hence, when the output of the control hydraulic pressure from the second solenoid 1315 is stopped, hydraulic oil supplied from the hydraulic pressure supplying circuit 110 is supplied to the lockup clutch 13 from the second port 13b through the supply passage 1301 and the second passage 1303. The lockup clutch 13 is thus driven in a releasing direction and the lockup clutch 13 is released.

At that time, hydraulic oil is discharged from the first port 13a, and the discharged hydraulic oil is introduced into the lubricating-hydraulic pressure passage 1400 through the first passage 1304 and the opening-discharge passage 1401.

When the control hydraulic pressure is output from the second solenoid 1315, the spool valve is driven by the biasing force of the control hydraulic pressure against the biasing force of the spring 1311. As shown in FIG. 2, the spool valve is displaced to a lockup engaging operating position where the supply passage 1301 and the first passage 1304 are connected to each other and the second passage 1303 and the engaging discharge passage 1302 are connected to each other.

Hence, at that time, hydraulic oil supplied from the hydraulic pressure supplying circuit 110 is supplied to the lockup clutch 13 from the first port 13a through the supply passage 1301 and the first passage 1304. The lockup clutch 13 is thus driven in the engaging direction and the lockup clutch 13 is engaged.

At that time, hydraulic oil is discharged from the second port 13b, and the hydraulic oil returns through the second passage 1303 and the engaging discharge passage 1302. The engaging discharge passage 1302 is provided with a lockup control valve 1320. The lockup control valve 1320 adjusts the amount of hydraulic oil that returns through the engaging discharge passage 1302.

The lockup control valve 1320 is provided with a spring 1321 that biases the spool valve of the lockup control valve 1320 in one direction, and a lockup engaging solenoid 1325, which outputs a control hydraulic pressure for driving the spool valve against the biasing force of the spring 1321. The lockup control valve 1320 is further provided with a first feedback passage 1322 and a second feedback passage 1305. The first feedback passage 1322 causes the hydraulic pressure of hydraulic oil flowing through the engaging discharge passage 1302 to be applied to the spool valve. The second feedback passage 1305 causes the hydraulic pressure of hydraulic oil flowing through the first passage 1304 to be applied to the spool valve.

In the hydraulic device 100 of the embodiment, when engaging the lockup clutch 13, a control hydraulic pressure that is output from the lockup engaging solenoid 1325 is increased or reduced, thereby operating the lockup control valve 1320, and the amount of hydraulic oil discharged through the engaging discharge passage 1302 is adjusted. The amount of hydraulic oil discharged from the torque converter 11 is thus controlled to adjust an engaging speed of the lockup clutch 13.

As shown on a right side of a central portion in FIG. 2, the lubricating-hydraulic pressure circuit 140 is connected to the location Z of a main passage 1104 of the hydraulic pressure supplying circuit 110 through the lubricating-hydraulic pressure passage 1400. Hydraulic oil introduced to the lubricating-hydraulic pressure circuit 140 through the lubricating-hydraulic pressure passage 1400 is supplied to various portions of the stepless transmission 10 as lubricant oil.

In the hydraulic device 100 of the embodiment, as shown in the lower portion of FIG. 2, a switch-over valve 1140 is provided at a section of a sub-passage 1105 in the hydraulic pressure supplying circuit 110 downstream of a location where a first bypass passage 1117 is connected and at a section upstream of the primary regulator 1110. The switch-over valve 1140 blocks this section.

The spool valve of the switch-over valve 1140 is always biased to the closing side to block the sub-passage 1105. A control hydraulic pressure that is output from the first solenoid 1245 and a control hydraulic pressure that is output from the second solenoid 1315 are input to the switch-over valve 1140. The first solenoid 1245 drives the clutch-apply control valve 1240, and the second solenoid 1315 drives the lockup relay valve 1310. When both the control hydraulic pressure that is output from the first solenoid 1245 and the control hydraulic pressure that is output from the second solenoid 1315 are input to the switch-over valve 1140, the spool valve is driven to the opening side against the biasing force of a spring 1141, and the sub-passage 1105 is brought into a communication state, where the sub-passage 1105 is in communication with a section downstream of the switch-over valve 1140.

On the other hand, when the output of the control hydraulic pressure from the first solenoid 1245 is stopped, the switch-over valve 1140 is displaced to the closing side by the biasing force of the spring 1241, and the sub-passage 1105 is brought into a blocked state, where the sub-passage 1105 is blocked.

In the hydraulic pressure supplying circuit 110 of the embodiment including the switch-over valve 1140, when control hydraulic pressures are output from both the first solenoid 1245 and the second solenoid 1315 and the switch-over valve 1140 is open, the check valves 1118 and 1128 open and close in accordance with the discharge performance of the main pump 1102, and the supply paths of hydraulic oil discharged from the sub-pump 1103 are automatically switched.

More specifically, immediately after the internal combustion engine is driven and the main pump 1102 and the sub-pump 1103 start pumping the hydraulic oil, the hydraulic pressure supplied to the speed-changing hydraulic pressure circuit 120 through the main passage 1104 is significantly small. Therefore, the hydraulic pressure applied to the spool valve of the primary regulator 1110 via the feedback passage 1112 is significantly small. Hence, at that time, the main port 1113 and the sub-port 1114 of the primary regulator 1110 are both closed. Therefore, hydraulic oil discharged from the sub-pump 1103 is supplied to the primary regulator 1110 through the sub-passage 1105, but the hydraulic oil is not supplied to a section downstream of the primary regulator 1110, and the hydraulic pressure in a section of the sub-passage 1105 upstream of the primary regulator 1110 gradually increases.

If the hydraulic pressure in a section of the sub-passage 1105 upstream of the primary regulator 1110 becomes higher than the hydraulic pressure in a section of the main passage 1104 upstream of the speed-changing hydraulic pressure circuit 120, the first check valve 1118 opens and hydraulic oil discharged from the sub-pump 1103 flows into the main passage 1104. Both the hydraulic oil discharged from the main pump 1102 and the hydraulic oil discharged from the sub-pump are supplied to the speed-changing hydraulic pressure circuit 120 through the main passage 1104.

If both the hydraulic oil discharged from the main pump 1102 and the hydraulic oil discharged from the sub-pump 1103 are thus supplied to the speed-changing hydraulic pressure circuit 120 and the hydraulic pressure of the hydraulic oil supplied to the speed-changing hydraulic pressure circuit 120 increases, the hydraulic pressure applied to the spool valve of the primary regulator 1110 via the feedback passage 1112 increases correspondingly.

First, the main port 1113 opens so that hydraulic oil is supplied to a section of the main passage 1104 located downstream of the primary regulator 1110, and both the hydraulic oil discharged from the main pump 1102 and the hydraulic oil discharged from the sub-pump 1103 are supplied to the torque converter-hydraulic pressure circuit 130 through the main passage 1104.

The hydraulic pressure of hydraulic oil supplied to the torque converter-hydraulic pressure circuit 130 through the main passage 1104 is applied to the spool valve of the speed-changing hydraulic pressure circuit 120 via the feedback passage 1122, and the main port 1123 opens.

Since the main port 1123 opens, hydraulic oil is supplied to a section of the main passage 1104 located downstream of the secondary regulator 1120, and both the hydraulic oil discharged from the main pump 1102 and the hydraulic oil discharged from the sub-pump 1103 are supplied to the lubricating-hydraulic pressure circuit 140 through the main passage 1104.

Immediately after the internal combustion engine is driven and when the discharge performance of the main pump 1102 is low, the first check valve 1118 opens, and both the hydraulic oil discharged from the main pump 1102 and the hydraulic oil discharged from the sub-pump 1103 are supplied to the hydraulic pressure circuits 120, 130 and 140 through the main passage 1104.

On the other hand, if the engine rotational speed increases and the discharge performance of the main pump 1102 and the sub-pump 1103 increases, the hydraulic pressure applied to the spool valve via the feedback passage 1112 of the primary regulator 1110 increases. The amount of displacement of the spool valve increases, accordingly.

If the amount of displacement of the spool valve of the primary regulator 1110 increases, the sub-port 1114 opens as shown in FIG. 3, and hydraulic oil is supplied to a section downstream of the primary regulator 1110 through the sub-passage 1105. If the hydraulic oil is supplied to the section downstream of the primary regulator 1110 through the sub-passage 1105 in this manner, the hydraulic pressure of the hydraulic oil in a section of the first bypass passage 1117 closer to the sub-passage 1105 decreases.

If the engine rotational speed increases and the discharge performance of the main pump 1102 and the sub-pump 1103 further increases, the hydraulic pressure of hydraulic oil in a section of the first bypass passage 1117 closer to the sub-passage 1105 becomes lower than the hydraulic pressure of hydraulic oil in the first bypass passage 1117 closer to the main passage 1104 and the first check valve 1118 closes.

According to the hydraulic pressure supplying circuit 110 of the embodiment, the primary regulator 1110 is designed such that the first check valve 1118 closes when the discharge performance of the main pump 1102 becomes equal to or higher than a first level L1 at which hydraulic oil required by the speed-changing hydraulic pressure circuit 120 can be covered only by hydraulic oil discharged from the main pump 1102.

If the discharge performance of the main pump 1102 becomes equal to or higher than the first level L1 and the first check valve 1118 closes, hydraulic oil discharged from the sub-pump 1103 is not supplied to the speed-changing hydraulic pressure circuit 120 and is supplied to a section downstream of the primary regulator 1110.

If the hydraulic oil discharged from the sub-pump 1103 is not supplied to the speed-changing hydraulic pressure circuit 120 but is supplied to the section downstream of the primary regulator 1110, the hydraulic pressure of hydraulic oil in a section of the second bypass passage 1127 closer to the sub-passage 1105 becomes higher than the hydraulic pressure of hydraulic oil in a section of the second bypass passage 1127 closer to the main passage 1104, and the second check valve 1128 opens. Hydraulic oil discharged from the sub-pump 1103 thus flows into the main passage 1104 through the second bypass passage 1127, and the hydraulic oil is supplied to the torque converter-hydraulic pressure circuit 130 and the lubricating-hydraulic pressure circuit 140 through the main passage 1104.

At that time, the hydraulic oil discharged from the main pump 1102 is supplied to all of the hydraulic pressure circuits 120, 130 and 140 through the main passage 1104.

If the engine rotational speed further increases and the discharge performance of the main pump 1102 and the sub-pump 1103 further increases when the first check valve 1118 closes and the hydraulic oil discharged from the sub-pump 1103 is not supplied to the speed-changing hydraulic pressure circuit 120 but is supplied to the torque converter-hydraulic pressure circuit 130 and the lubricating-hydraulic pressure circuit 140 through the second bypass passage 1127, the hydraulic pressure applied to the spool valve via the feedback passage 1122 of the secondary regulator 1120 increases. Therefore, the amount of displacement of the spool valve increases.

If the amount of displacement of the spool valve of the secondary regulator 1120 increases in this manner, the sub-port 1124 opens as shown in FIG. 3, and hydraulic oil is supplied to a section downstream of the secondary regulator 1120 through the sub-passage 1105. If the hydraulic oil is supplied to the section downstream of the secondary regulator 1120 through the sub-passage 1105, the hydraulic pressure of hydraulic oil in a section of the second bypass passage 1127 closer to the sub-passage 1105 decreases.

If the engine rotational speed increases and the discharge performance of the main pump 1102 and the sub-pump 1103 further increases, the hydraulic pressure of hydraulic oil in a section of the second bypass passage 1127 closer to the sub-passage 1105 becomes lower than the hydraulic pressure of hydraulic oil in a section of the second bypass passage 1127 closer to the main passage 1104, and the second check valve 1128 closes.

In the hydraulic pressure supplying circuit 110 of the embodiment, the secondary regulator 1120 is designed such that the second check valve 1128 closes when the discharge performance of the main pump 1102 becomes equal to or higher than a second level L2 at which hydraulic oil required by the speed-changing hydraulic pressure circuit 120 and the torque converter-hydraulic pressure circuit 130 can be covered only by hydraulic oil discharged from the main pump 1102.

If the discharge performance of the main pump 1102 becomes equal to or higher than the second level L2 and the second check valve 1128 closes, hydraulic oil discharged from the sub-pump 1103 is not supplied to the speed-changing hydraulic pressure circuit 120 or the torque converter-hydraulic pressure circuit 130 but is supplied to the lubricating-hydraulic pressure circuit 140 located downstream of the secondary regulator 1120.

At that time also, the hydraulic oil discharged from the main pump 1102 is supplied to all of the hydraulic pressure circuits 120, 130 and 140 through the main passage 1104.

If the amount of hydraulic oil supplied from the main passage 1104 and the sub-passage 1105 to the lubricating-hydraulic pressure circuit 140 becomes greater than the amount of hydraulic oil required by the lubricating-hydraulic pressure circuit 140, the hydraulic pressure applied to the spool valve of the lubrication regulator 1130 via the feedback passage 1132 increases. As a result, the drain port 1133 opens and a portion of hydraulic oil returns through the drain passage 1106. This configuration prevents the hydraulic pressure of hydraulic oil supplied to the lubricating-hydraulic pressure circuit 140 from excessively increasing.

According to the hydraulic device 100 of the embodiment, when the switch-over valve 1140 opens and is switched to the communication state, the check valves 1118 and 1128 open or close in accordance with the discharge performance of the main pump 1102, and the supply paths for hydraulic oil discharged from the sub-pump 1103 are automatically switched.

That is, when the discharge performance of the main pump 1102 is lower than the first level L1, the first check valve 1118 opens, and both the hydraulic oil discharged from main pump 1102 and the hydraulic oil discharged from the sub-pump 1103 are supplied to all of the hydraulic pressure circuits 120, 130 and 140.

On the other hand, when the discharge performance of the main pump 1102 is equal to or higher than the first level L1 and lower than the second level L2, the first check valve 1118 closes, and hydraulic oil discharged from the main pump 1102 is supplied to the hydraulic pressure circuits 120, 130 and 140. In this state, the hydraulic oil discharged from the sub-pump 1103 is not supplied to the speed-changing hydraulic pressure circuit 120 but is supplied to the torque converter-hydraulic pressure circuit 130 and the lubricating-hydraulic pressure circuit 140.

When the discharge performance of the main pump 1102 is equal to or higher than the second level L2, the second check valve 1128 closes, hydraulic oil discharged from the sub-pump 1103 is not supplied to the speed-changing hydraulic pressure circuit 120 or the torque converter-hydraulic pressure circuit 130 but is supplied only to the lubricating-hydraulic pressure circuit 140.

On the other hand, when the output of a control hydraulic pressure from the first solenoid 1245 is stopped and the switch-over valve 1140 closes and is switched to the blocked state, the hydraulic pressure in a section of the sub-passage 1105 located upstream of the switch-over valve 1140 increases and the first check valve 1118 opens. As a result, hydraulic oil discharged from the sub-pump 1103 flows through the main passage 1104 together with hydraulic oil discharged from the main pump 1102.

According to the hydraulic device 100 of the embodiment, during driving of the vehicle after the garage operation is completed, control hydraulic pressures are output from both the first solenoid 1245 and the second solenoid 1315 to open the switch-over valve 1140 and the switch-over valve 1140 is held in the communication state.

As conditions for closing the switch-over valve 1140, the following conditions are set. If any of them is established, the output of the control hydraulic pressure from the first solenoid 1245 is stopped, and the switch-over valve 1140 is closed and is switched to the blocked state:

when operation of the accelerator pedal 28 is released;

when the brake pedal 29 is depressed;

when an operation amount of the accelerator pedal 28 becomes equal to or higher than a preset reference operation amount;

when speed-changing control mode is set to the sequential mode;

when speed-changing control mode is set to the sport mode; and when locking of wheels is detected.

The magnitude of the reference operation amount is set such that it is possible to determine that abrupt acceleration is requested when the operation amount of the accelerator pedal 28 becomes equal to or higher than the reference operation amount. It is determined that the speed-changing control mode is the sequential mode when the sequential mode switch 26 is "ON", and that the speed-changing control mode is the sport mode when the sport mode switch 27 is "ON". The locking of wheels is detected based on a rotational speed of each wheel detected by the wheel speed sensor 24.

According to the above-described embodiment, the following advantages can be obtained.

(1) When the switch-over valve 1140 is opened to be in the communication state, the check valves 1118 and 1128 open or close in accordance with the discharge performance of the main pump 1102, and supply paths for hydraulic oil discharged from the sub-pump 1103 are automatically switched. When the switch-over valve 1140 closes and is in the blocked state on the other hand, the hydraulic pressure in a section of the sub-passage 1105 located upstream of the switch-over valve 1140 increases, the first check valve 1118 opens, and hydraulic oil discharged from the sub-pump 1103 flows through the main passage 1104 together with hydraulic oil discharged from the main pump 1102. That is, by closing the switch-over valve 1140 and bringing the switch-over valve 1140 into the blocked state, it is possible to quickly increase the hydraulic pressure in the first check valve 1118 closer to the sub-passage 1105, to open the first check valve 1118 and to introduce the hydraulic oil discharged from the sub-pump 1103 into the main passage 1104.

It is also possible to previously bring the switch-over valve 1140 into the blocked state, to open the first check valve 1118, and to introduce hydraulic oil discharged from the sub-pump 1103 into the main passage 1104 before the primary regulator 1110 is operated by a control hydraulic pressure of the line pressure controlling-linear solenoid 1115 and the hydraulic pressure of hydraulic oil to be supplied to the speed-changing hydraulic pressure circuit 120 is increased. Hence, when it is predicted that the hydraulic pressure required by the speed-changing hydraulic pressure circuit 120 will increase, it is possible to previously operate the switch-over valve 1140 to introduce hydraulic oil discharged from the sub-pump 1103 into the main passage 1104, and to operate the primary regulator 1110 when the hydraulic pressure required by the speed-changing hydraulic pressure circuit 120 increases, and it is possible to quickly increase the hydraulic pressure of hydraulic oil to be supplied to the speed-changing hydraulic pressure circuit 120.

That is, supply paths for hydraulic oil discharged from the sub-pump 1103 are automatically switched in accordance with the discharge performance of the main pump 1102, and the switch-over valve 1140 is closed and brought into the blocked state. Therefore, when the hydraulic pressure required by the speed-changing hydraulic pressure circuit 120 increases, it is possible to quickly increase the hydraulic pressure of hydraulic oil to be supplied to the speed-changing hydraulic pressure circuit 120.

(2) When the operation of the accelerator pedal 28 is released, it is predicted that deceleration is carried out. When deceleration is carried out, since slippage is prone to be generated on the belt 17, which is wound around the pulleys 15 and 16 of the stepless transmission 10, it is preferable that a high hydraulic pressure be supplied to the pulleys 15 and 16 to increase the belt pinching pressure, thereby suppressing slippage.

According to the hydraulic device 100 of the embodiment, when the operation of the accelerator pedal 28 is released, the output of the control hydraulic pressure from the first solenoid 1245 is stopped, the switch-over valve 1140 is closed and is brought into the blocked state. Hence, it is predicted that the deceleration will be carried out based on the fact that the operation of the accelerator pedal 28 is released. Based on this, it is possible to previously introduce hydraulic oil discharged from the sub-pump 1103 into the main passage 1104. When the deceleration is carried out and it becomes necessary to increase the belt pinching pressure and the hydraulic pressure required by the speed-changing hydraulic pressure circuit 120 increases, it is possible to swiftly supply the necessary hydraulic pressure to suppress slippage of the belt 17.

(3) According to the hydraulic device 100 of the embodiment, when the brake pedal 29 is depressed, the output of the control hydraulic pressure from the first solenoid 1245 is stopped, and the switch-over valve 1140 is closed and brought into the blocked state. Hence, when the brake pedal 29 is depressed and the deceleration is carried out, the switch-over valve 1140 is brought into the blocked state, and hydraulic oil discharged from the sub-pump 1103 is introduced into the main passage 1104. When the deceleration is carried out and it is necessary to increase the hydraulic pressure to be supplied to the pulleys 15 and 16 and to increase the belt pinching pressure, it is possible to quickly increase the hydraulic pressure to be supplied to the speed-changing hydraulic pressure circuit 120, and to suppress slippage of the belt 17.

(4) At the time of abrupt acceleration, since it is necessary to transmit a great drive force through the stepless transmission 10, and to quickly change speed, the hydraulic pressure required by the speed-changing hydraulic pressure circuit 120 is abruptly increased. Hence, according to the hydraulic device 100 of the embodiment, the output of the control hydraulic pressure from the first solenoid 1245 is stopped and the switch-over valve 1140 is closed and brought into the blocked state when the operation amount of the accelerator pedal 28 becomes equal to or higher than the reference operation amount. Hence, it is possible to determine that abrupt acceleration has been requested based on the fact that the operation amount of the accelerator pedal 28 is equal to or higher than the reference operation amount. Based on this, it is possible to introduce hydraulic oil discharged from the sub-pump 1103 into the main passage 1104. Therefore, when the abrupt acceleration is required and swift speed changing operation is required, it is possible to quickly increase the hydraulic pressure of hydraulic oil to be supplied to the speed-changing hydraulic pressure circuit 120.

(5) When the speed-changing control mode is switched to the sequential mode, it is necessary to quickly change the transmission gear ratio when a transmission gear is shifted to another gear by a driver's speed-changing operation.

According to the hydraulic device 100 of the embodiment on the other hand, when the speed-changing control mode is switched to the sequential mode, the output of the control hydraulic pressure from the first solenoid 1245 is stopped and the switch-over valve 1140 is closed and brought into the blocked state. Hence, when the sequential mode is selected, it is possible to quickly increase the hydraulic pressure of hydraulic oil to be supplied to the speed-changing hydraulic pressure circuit 120, and to realize the swift speed-changing operation.

(6) When the speed-changing control mode is switched to the sport mode, it is assumed that a driver desires to run in a sporty manner and tries to swiftly accelerate or decelerate. That is, when the sport mode is selected, it is assumed that the possibility of abrupt acceleration or abrupt deceleration based on the sport mode.

According to the hydraulic device 100 of the embodiment, when the speed-changing control mode is switched to the sport mode, the output of a control hydraulic pressure from the first solenoid 1245 is stopped and the switch-over valve 1140 is closed and brought into the blocked state. Hence, when the sport mode is selected, hydraulic oil discharged from the sub-pump 1103 is introduced into the main passage 1104. When abrupt acceleration or abrupt deceleration is carried out, it is possible to quickly increase the hydraulic pressure of hydraulic oil to be supplied to the speed-changing hydraulic pressure circuit 120 to realize the swift speed-changing operation, and it is possible to suppress slippage of the belt 17.

(7) When the brake pedal 29 is operated and the wheels are locked, since the rotation of the secondary pulley 16 connected to the wheels suddenly stop, a particularly large load is applied to the stepless transmission 10, and the belt 17 wound around the pulleys 15 and 16 is prone to slip. According to the hydraulic device 100 of the embodiment, when locking of wheels is detected, the output of a control hydraulic pressure from the first solenoid 1245 is stopped and the switch-over valve 1140 is closed and brought into the blocked state.

According to this configuration, when locking of wheels is detected, it is possible to quickly increase the hydraulic pressure of hydraulic oil to be supplied to the speed-changing hydraulic pressure circuit 120, and it is possible to increase the belt pinching pressure to suppress slippage of the belt 17.

(8) A control hydraulic pressure from the second solenoid 1315 that drives the lockup relay valve 1310 is applied to the clutch-apply control valve 1240 so that the spool valve of the clutch-apply control valve 1240 is not displaced to the garage operating position even if a control hydraulic pressure is output from the first solenoid 1245 when a control hydraulic pressure is output from the second solenoid 1315. Both the control hydraulic pressure that is output from the first solenoid 1245 and the control hydraulic pressure that is output from the second solenoid 1315 are input to the switch-over valve 1140, the switch-over valve 1140 is switched to the communication state when the control hydraulic pressures are output from both the first solenoid 1245 and the second solenoid 1315, and the switch-over valve 1140 is switched to the blocked state when the control hydraulic pressure is not output from the first solenoid 1245.

Hence, it is possible to operate the switch-over valve 1140 utilizing the first solenoid 1245, which is provided for operating the clutch-apply control valve 1240, and utilizing the second solenoid 1315, which is provided for operating the lockup relay valve 1310, without providing an additional solenoid for operating the switch-over valve 1140.

The above described embodiment may be modified as follows.

Although a load of the sub-pump 1103 is switched in three steps utilizing the first check valve 1118 and the second check valve 1128 in the above-described embodiment, it is possible to employ the configuration in which the load of the sub-pump 1103 is switched in four steps.

Figure 4:
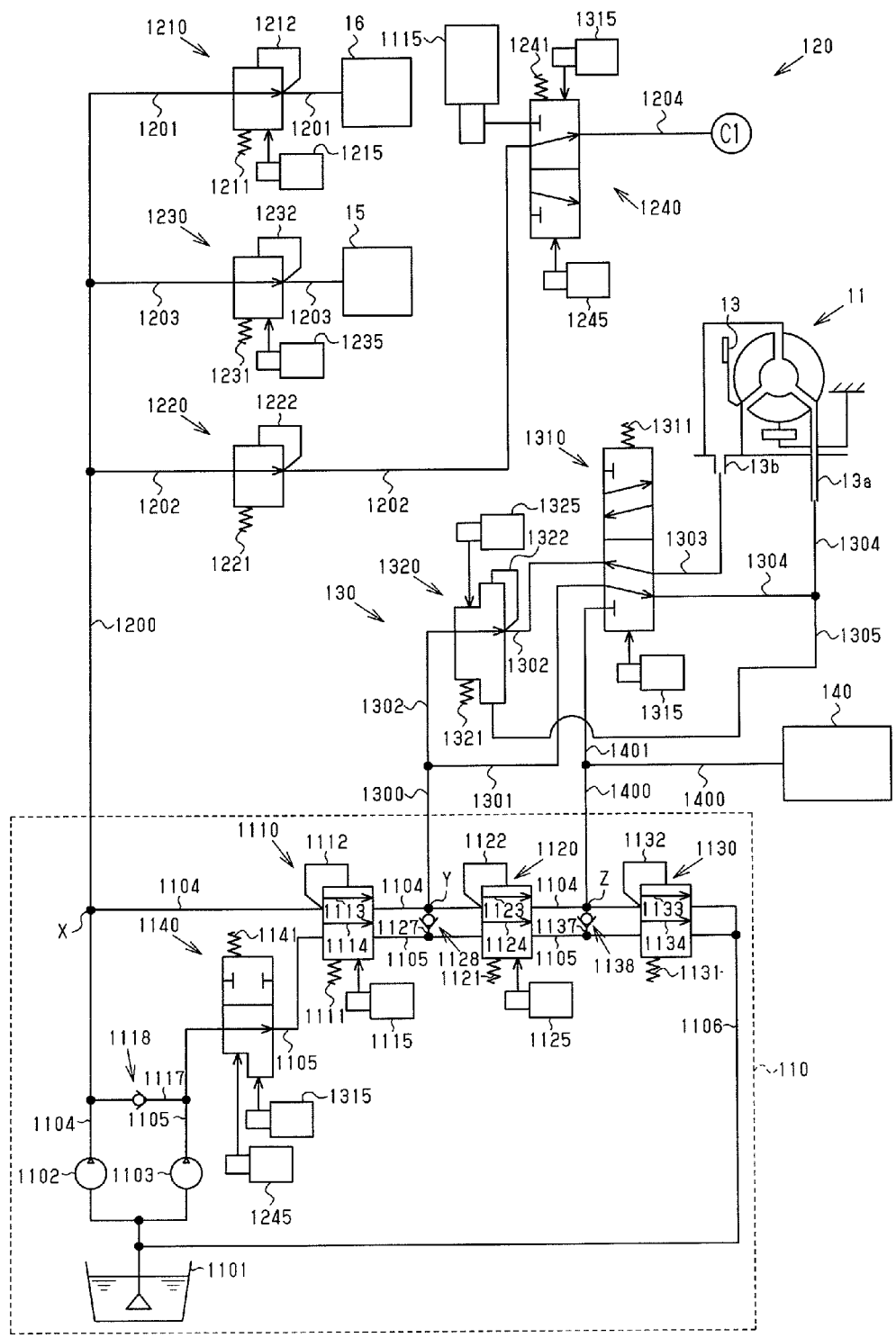
FIG. 4 is a schematic diagram showing the configuration of a hydraulic device according to a modification of the embodiment.

More specifically, as shown in FIG. 4, the lubrication regulator 1130 includes a sub-port 1134 like the primary regulator 1110 and the secondary regulator 1120. The sub-passage 1105 that is located downstream of the secondary regulator 1120 is connected to the lubrication regulator 1130. A third bypass passage 1137 is provided at a location Z of the main passage 1104, where the lubricating-hydraulic pressure circuit 140 is connected. The main passage 1104 and a section of the sub-passage 1105 located downstream of the secondary regulator 1120 and located upstream of the lubrication regulator 1130 are brought into communication with each other through the third bypass passage 1137. The third bypass passage 1137 is provided with a third check valve 1138. The third check valve 1138 opens when the hydraulic pressure of hydraulic oil flowing through a section of the third bypass passage 1137 closer to the sub-passage 1105 is greater than the hydraulic pressure of hydraulic oil flowing through a section of the third bypass passage 1137 closer to the main passage 1104, and the third check valve 1138 permits only a flow of hydraulic oil from the sub-passage 1105 toward the main passage 1104.

According to this configuration, when the switch-over valve 1140 opens and is in a communication state, when the discharge performance of the main pump 1102 further increases and becomes higher than the second level L2 and the discharge performance becomes equal to or higher than a third level L3 at which hydraulic oil supplied to the hydraulic pressure circuits 120, 130 and 140 can be covered only by the hydraulic oil discharged from the main pump 1102, the third check valve 1138 closes, hydraulic oil discharged from the sub-pump 1103 is not supplied to any of the hydraulic pressure circuits 120, 130 and 140, and the hydraulic oil returns through the drain passage 1106. According to this, it is possible to further reduce the load of the sub-pump 1103, and to further reduce the consumption amount of fuel by the internal combustion engine due to drive load on the sub-pump 1103.

When the switch-over valve 1140 is closed and brought into the blocked state, the first check valve 1118 opens and hydraulic oil discharged from the sub-pump 1103 is introduced into the main passage 1104 like the hydraulic device 100 of the above-described embodiment.

That is, even if this configuration is employed, the supply paths for hydraulic oil discharged from the sub-pump 1103 are automatically switched in accordance with the discharge performance of the main pump 1102, the switch-over valve 1140 is closed and brought into the blocked state like the above-described embodiment. Therefore, when the hydraulic pressure required by the speed-changing hydraulic pressure circuit 120 increases, it is possible to quickly increase the hydraulic pressure of hydraulic oil to be supplied to the speed-changing hydraulic pressure circuit 120.

In the above-described embodiment, a configuration is shown in which supply of hydraulic oil to a section of the sub-passage 1105 located downstream of the switch-over valve 1140 is blocked by closing the switch-over valve 1140. Instead of blocking the supply of hydraulic oil in the sub-passage 1105, it is also possible to employ such a configuration that the state is switched to a first state in which the sub-passage 1105 is brought into communication with a section of the main passage 1104 located upstream of the location X, where the speed-changing hydraulic pressure circuit 120 is connected.

Figure 5:
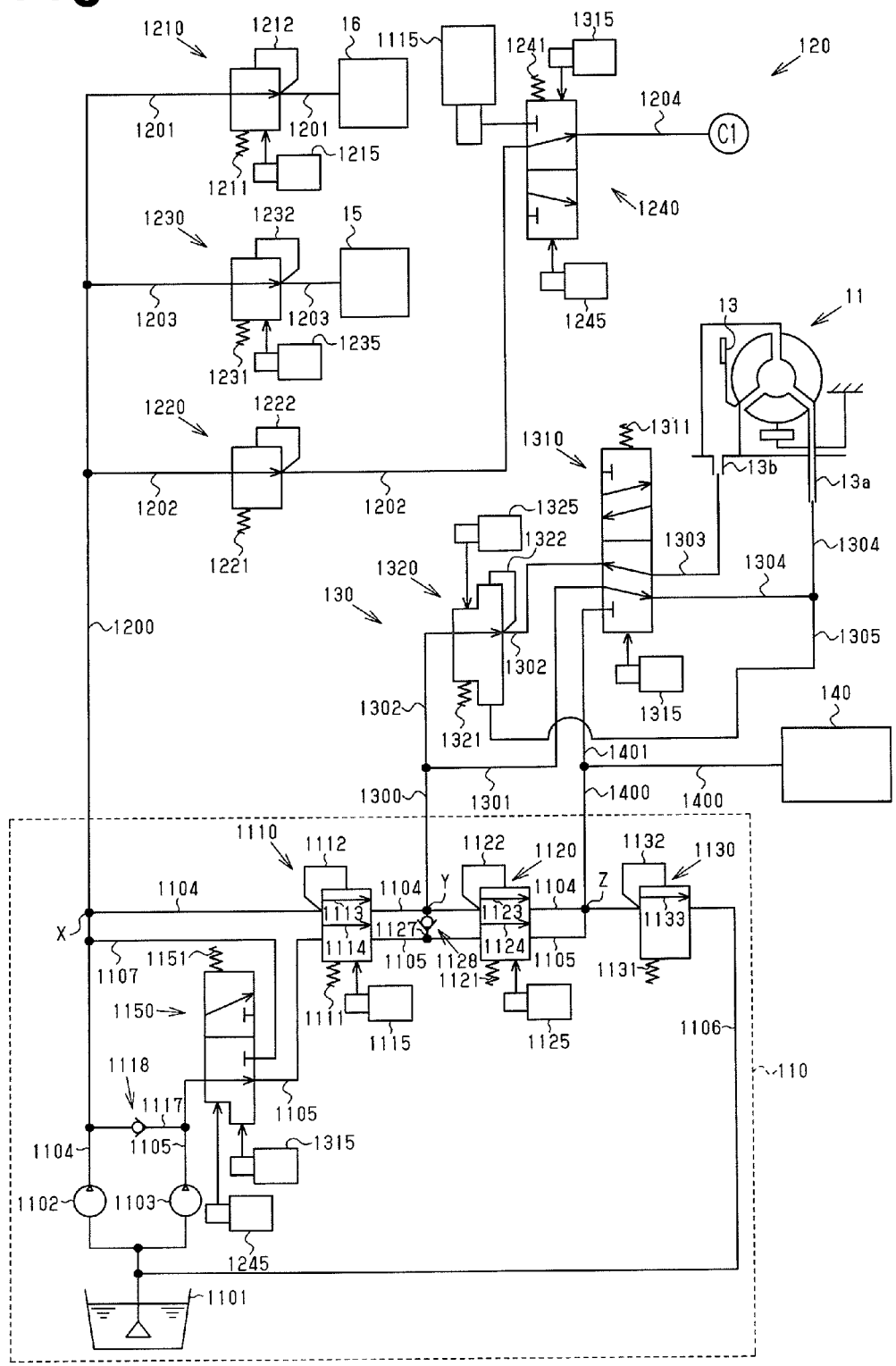
FIG. 5 is a schematic diagram showing the configuration of a hydraulic device according to another modification of the embodiment.

More specifically, as shown in FIG. 5, a connecting passage 1107 is connected to a section of the main passage 1104 located upstream of the location X, where the speed-changing hydraulic pressure circuit 120 is connected. There is provided a switch-over valve 1150 that switches between a second state, where the sub-passage 1105 is brought into communication with the primary regulator 1110, and a first state, where the sub-passage 1105 is connected to the connecting passage 1107 and brought into communication with the main passage 1104.

A spool valve of the switch-over valve 1150 is always biased by a spring 1151 toward a position of the first state. A control hydraulic pressure that is output from the first solenoid 1245 and a control hydraulic pressure that is output from the second solenoid 1315 are input to the switch-over valve 1150 like the switch-over valve 1140 of the above-described embodiment. The switch-over valve 1150 is switched to the second state when both the control hydraulic pressure that is output from the first solenoid 1245 and the control hydraulic pressure that is output from the second solenoid 1315 are input to the switch-over valve 1150. If the output of the control hydraulic pressure from the first solenoid 1245 is stopped, the spool valve of the switch-over valve 1150 is displaced by the biasing force of the spring 1151, and the switch-over valve 1150 is switched to the first state.

If this configuration is employed, when the switch-over valve 1150 is in the second state, the check valves 1118 and 1128 open or close in accordance with the discharge performance of the main pump 1102, and the supply paths for hydraulic oil discharged from the sub-pump 1103 are automatically switched. On the other hand, when the switch-over valve 1150 is in the first state, hydraulic oil discharged from the sub-pump 1103 flows through the main passage 1104 together with hydraulic oil discharged from the main pump 1102. That is, hydraulic oil discharged from the sub-pump 1103 can be introduced directly into the main passage 1104 through the connecting passage 1107.

According to this configuration, the primary regulator 1110 is operated by a control hydraulic pressure of the line pressure controlling-linear solenoid 1115. Before the hydraulic pressure is increased of the hydraulic oil to be supplied to the speed-changing hydraulic pressure circuit 120, the switch-over valve 1150 can be operated and brought into the first state, and hydraulic oil discharged from the sub-pump 1103 can be introduced into the main passage 1104, in advance. Hence, when it is predicted that the hydraulic pressure required by the speed-changing hydraulic pressure circuit 120 will increase, the switch-over valve 1150 is previously operated and brought into the first state, and hydraulic oil discharged from the sub-pump 1103 is introduced into the main passage 1104. When the hydraulic pressure required by the speed-changing hydraulic pressure circuit 120 increases, the primary regulator 1110 is operated, and it is possible to quickly increase the hydraulic pressure of hydraulic oil to be supplied to the speed-changing hydraulic pressure circuit 120. That is, like the above-described embodiment, it is possible to automatically switch between supply paths for hydraulic oil discharged from the sub-pump 1103 in accordance with the discharge performance of the main pump 1102. When the hydraulic pressure required by the speed-changing hydraulic pressure circuit 120 increases, it is possible to quickly increase the hydraulic pressure of the hydraulic oil to be supplied to the speed-changing hydraulic pressure circuit 120.

In the above-described embodiment, the switch-over valve is operated utilizing a control hydraulic pressure that is output from the first solenoid 1245 and a control hydraulic pressure that is output from the second solenoid 1315, but the configuration for operating the switch-over valve may be changed as necessary.

Figure 6:
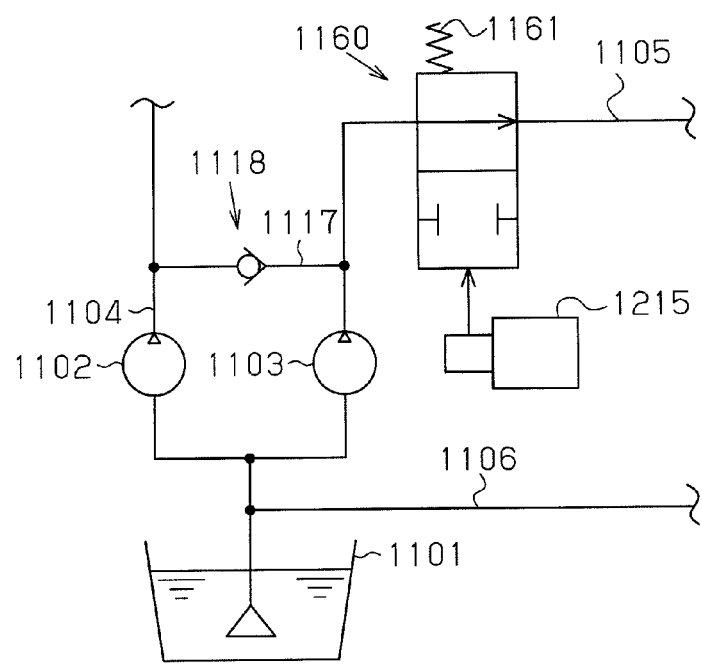
FIG. 6 is a schematic diagram showing the configuration in the vicinity of a switch-over valve of a hydraulic device according to a modification of the embodiment.

For example, as shown in FIG. 6, it is possible to employ such a configuration that a switch-over valve 1160 that is always biased to its opening side by the biasing force of a spring 1161 is provided instead of the switch-over valve 1140 in the above-described embodiment. The hydraulic pressure that is output from the belt pinching pressure controlling-linear solenoid 1215 as a first linear solenoid increases when a belt pinching pressure is increased. A control hydraulic pressure that is output from the belt pinching pressure controlling-linear solenoid 1215 is input to the switch-over valve 1160. The switch-over valve 1160 is driven to its closing side by a control hydraulic pressure that is output from the belt pinching pressure controlling-linear solenoid 1215.

According to this configuration, if a control hydraulic pressure that is output from the belt pinching pressure controlling-linear solenoid 1215 increases to increase the belt pinching pressure, the switch-over valve 1160 is driven to the closing side correspondingly and the first check valve 1118 opens. Therefore, when the hydraulic pressure required by the speed-changing hydraulic pressure circuit 120 is increased to increase the belt pinching pressure, it is possible to supply hydraulic oil discharged from the sub-pump 1103 to the speed-changing hydraulic pressure circuit 120 through the main passage 1104.

Another example of the first linear solenoid, in which the hydraulic pressure increases when the belt pinching pressure increases as in the belt pinching pressure controlling-linear solenoids 1215, is the line pressure controlling-linear solenoid 1115, which outputs a control hydraulic pressure for biasing the primary regulator 1110 to its closing side. Hence, it is possible to employ such a configuration that a control hydraulic pressure that is output from the line pressure controlling-linear solenoid 1115 is input to the switch-over valve 1160 instead of a control hydraulic pressure that is output from the belt pinching pressure controlling-linear solenoid 1215, and the switch-over valve 1160 is operated by the control hydraulic pressure of the line pressure controlling-linear solenoid 1115.

When abrupt acceleration or abrupt deceleration is carried out, the transmission gear ratio is prone to be increased. Hence, when the transmission gear ratio is large, it is assumed that abrupt acceleration or abrupt deceleration is carried out based on this fact, and it is assumed that the stepless transmission 10 is in a state where slippage is prone to be generated on the belt 17. Hence, a configuration in which the switch-over valve can be operated may be employed based on a condition that the transmission gear ratio is large.

Figure 7:
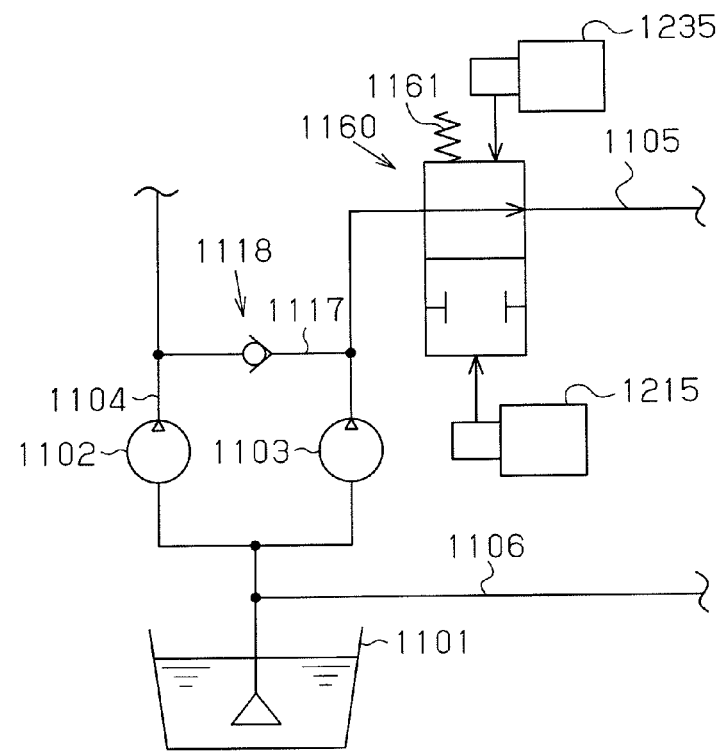
FIG. 7 is a schematic diagram showing the configuration in the vicinity of a switch-over valve of a hydraulic device according to another modification of the embodiment.

As such a configuration, as shown in FIG. 7 for example, it is possible to employ such a configuration that a control hydraulic pressure that is output from the speed-changing controlling-linear solenoid 1235 is input to the switch-over valve 1160, and a spool valve of the switch-over valve 1160 is driven by this control hydraulic pressure in a direction opposite to a direction in which the spool valve is driven by a control hydraulic pressure that is output from the belt pinching pressure controlling-linear solenoid 1215.

In the stepless transmission 10, the hydraulic pressure of hydraulic oil supplied to the primary pulley 15 is increased when the transmission gear ratio is reduced, and the winding radius of the belt 17 around the primary pulley 15 is increased. When the transmission gear ratio is small, a control hydraulic pressure that is output from the speed-changing controlling-linear solenoid 1235 is increased to increase the hydraulic oil supplied to the primary pulley 15. Hence, according to this configuration, when the transmission gear ratio is small, even if the control hydraulic pressure that is output from the belt pinching pressure controlling-linear solenoid 1215 increases, the spool valve of the switch-over valve 1160 is less prone to be driven to its closing side.

When the transmission gear ratio is large on the other hand, since the control hydraulic pressure that is output from the speed-changing controlling-linear solenoid 1235 is reduced to reduce the hydraulic oil supplied to the primary pulley 15, the switch-over valve 1160 is prone to be driven to the closing side when the hydraulic pressure of hydraulic oil that is output from the belt pinching pressure controlling-linear solenoid 1215 increases. That is, according to this configuration, a configuration in which the switch-over valve 1160 can be operated can be realized based on a condition that the transmission gear ratio is large.

Figure 8:
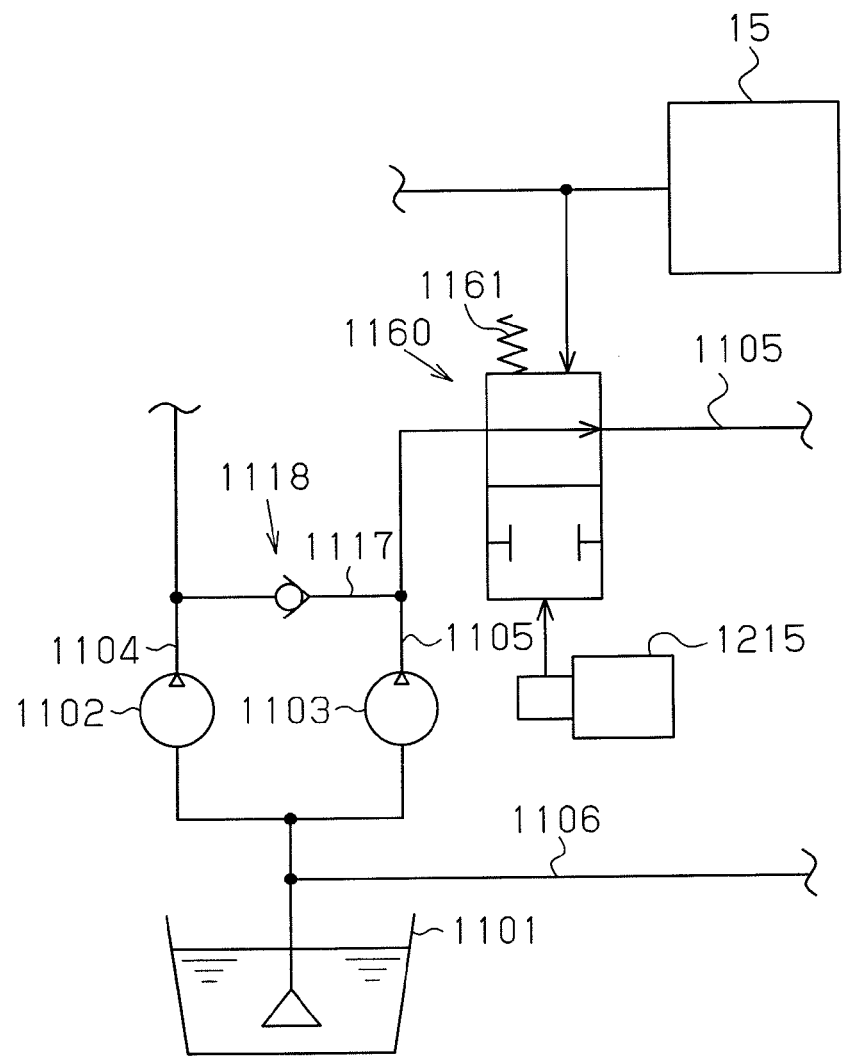
FIG. 8 is a schematic diagram showing the configuration in the vicinity of a switch-over valve of a hydraulic device according to another modification of the embodiment.
Figure 9:
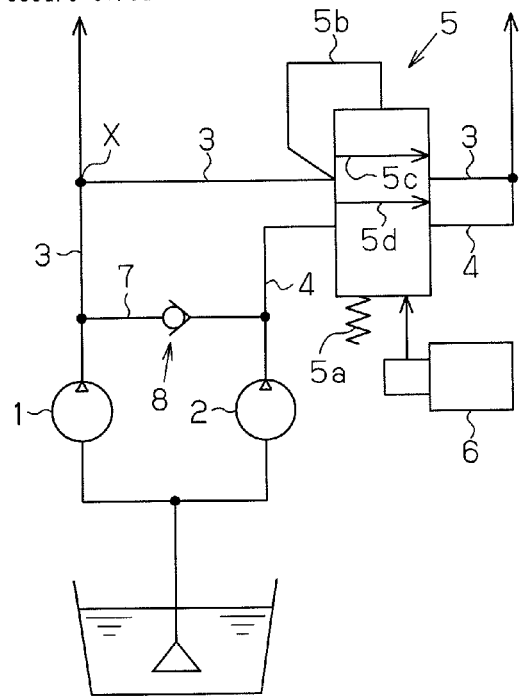
FIG. 9 is a schematic diagram showing the configuration of a conventional hydraulic device.
Figure 10:
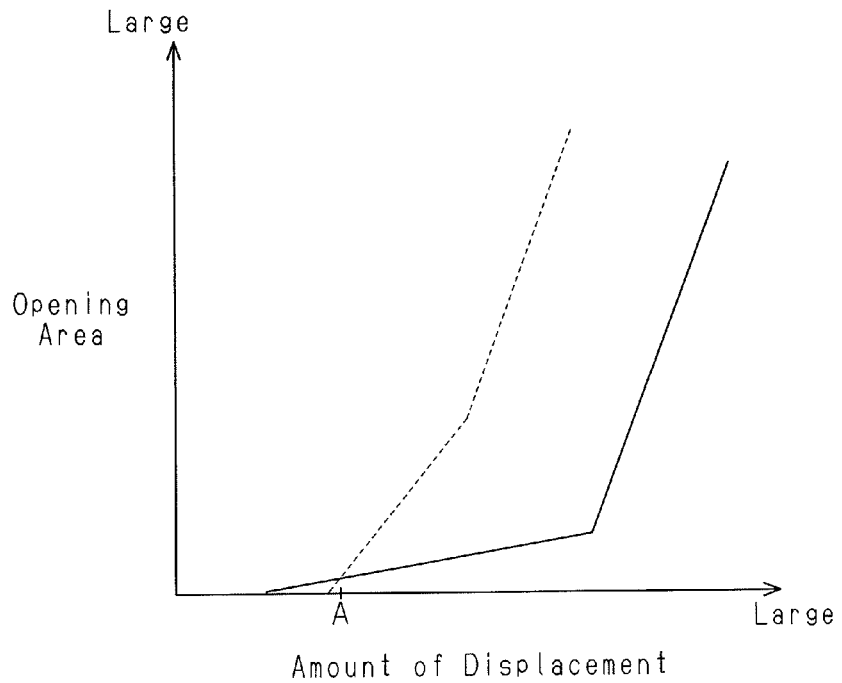
FIG. 10 is a graph showing the relationship between the amount of displacement of a spool valve and opening areas of a main port and a sub-port in the conventional hydraulic device.

Further, it is possible to employ such a configuration that the hydraulic pressure of hydraulic oil supplied to the primary pulley 15 is input to the switch-over valve 1160 as shown in FIG. 8, and the spool valve is driven in a direction opposite to a direction in which the spool valve is driven by a control hydraulic pressure that is output from the belt pinching pressure controlling-linear solenoid 1215. Even if this configuration is employed, it is possible to realize a configuration in which the switch-over valve 1160 can be operated based on a condition that the transmission gear ratio is large as in the configuration shown in FIG. 7.

Even in the configurations shown in FIGS. 7 and 8, it is possible to employ such a configuration that a control hydraulic pressure that is output from the line pressure controlling-linear solenoid 1115 is input to the switch-over valve 1160 instead of the control hydraulic pressure that is output from the belt pinching pressure controlling-linear solenoid 1215.

The invention claimed is:

1. A hydraulic device for a stepless transmission, the hydraulic device comprising:
    an engine-driven main pump and an engine-driven sub-pump;
    a main passage for connecting the main pump to a speed-changing hydraulic pressure circuit and a lubricating-hydraulic pressure circuit;
    a sub-passage for connecting the sub-pump to the lubricating-hydraulic pressure circuit;
    a regulator that opens when the hydraulic pressure of hydraulic oil supplied to the speed-changing hydraulic pressure circuit through the main passages increases, controls the amount of hydraulic oil supplied to the lubricating-hydraulic pressure circuit through the main passage and the sub-passage, and adjusts the hydraulic pressure of hydraulic oil supplied to the speed-changing hydraulic pressure circuit;

a bypass passage for connecting, to each other, a section of the main passage located upstream of a location where the speed-changing hydraulic pressure circuit is connected and a section of the sub-passage located upstream of the regulator;

a check valve that is provided in the bypass passage and permits only flow of hydraulic oil in a direction from the sub-passage toward the main passage, wherein the check valve closes when discharge performance of the main pump increases, and supply paths for hydraulic oil discharged from the sub-pump are automatically switched in accordance with the discharge performance of the main pump; and a switch-over valve provided at a section of the sub-passage located downstream of a location where the bypass passage is connected and located upstream of the regulator, and the switch-over valve is configured to be capable of being switched between a blocked state, where supply of hydraulic oil to a section of the sub-passage located downstream of the switch-over valve is blocked, and a communication state, where supply of hydraulic oil to the section of the sub-passage located downstream of the switch-over valve is permitted, wherein the switch-over valve is switched to the blocked state before the supply paths for hydraulic oil discharged from the sub-pump are automatically switched in accordance with the discharge performance of the main pump.

2. The hydraulic device for a stepless transmission according to claim 1, wherein the switch-over valve is switched to the blocked state when operation of an accelerator operating member of a vehicle provided with the stepless transmission is released.

3. The hydraulic device for a stepless transmission according to claim 1, wherein the switch-over valve is switched to the blocked state when a brake operating member of a vehicle provided with the stepless transmission is operated.

4. The hydraulic device for a stepless transmission according to claim 1, wherein the switch-over valve is switched to the blocked state when an operation amount of an accelerator operating member of a vehicle provided with the stepless transmission becomes equal to or greater than a reference operation amount.

5. The hydraulic device for a stepless transmission according to claim 1, wherein the stepless transmission includes, as a speed-changing control mode, a sequential mode for selecting one of a plurality of transmission gears having different transmission gear ratios, and when the speed-changing control mode is switched to the sequential mode, the switch-over valve is switched to the blocked state.

6. The hydraulic device for a stepless transmission according to claim 1, wherein the stepless transmission includes, as speed-changing control modes, a normal mode and a sport mode having a transmission gear ratio greater than that of the normal mode, and the switch-over valve is switched to the blocked state when the speed-changing control mode is switched to the sport mode.

7. The hydraulic device for a stepless transmission according to claim 1, wherein the switch-over valve is switched to the blocked state when a brake operating member of a vehicle provided with the stepless transmission is operated and locking of wheels is detected.

8. The hydraulic device for a stepless transmission according to claim 1, wherein the stepless transmission further includes a forward/reverse switching mechanism having a clutch, and a lockup clutch, the hydraulic device further comprises:
a clutch-apply control valve that switches between supply paths for hydraulic oil supplied to the clutch of the forward/reverse switching mechanism;
a first solenoid that outputs a control hydraulic pressure for driving the clutch-apply control valve to a garage operating position;
a lockup relay valve that switches between supply paths for hydraulic oil supplied to the lockup clutch; and
a second solenoid that outputs a control hydraulic pressure for driving the lockup relay valve to a lockup engaging operating position, and wherein
a control hydraulic pressure that is output from the second solenoid is input to the clutch-apply control valve so that when a control hydraulic pressure is output from the second solenoid, the clutch-apply control valve is not displaced to the garage operating position even if a control hydraulic pressure is output from the first solenoid,
both a control hydraulic pressure that is output from the first solenoid and a control hydraulic pressure that is output from the second solenoid are input to the switch-over valve,
the switch-over valve is switched to the communication state when control hydraulic pressures are output from both the first solenoid and the second solenoid, and
the switch-over valve is switched to the blocked state when the control hydraulic pressure is not output from the first solenoid.

9. The hydraulic device for a stepless transmission according to claim 1, further comprising a first linear solenoid that increases a control hydraulic pressure output therefrom when increasing a belt pinching pressure of the stepless transmission, wherein
as a control hydraulic pressure that is output from the first linear solenoid increases, the belt pinching pressure increases, and
by a control hydraulic pressure that is output from the first linear solenoid, the switch-over valve is driven such that the switch-over valve is switched to the blocked state.

10. A hydraulic device for a stepless transmission, the hydraulic device comprising:
an engine-driven main pump and an engine-driven sub-pump;
a main passage for connecting the main pump to a speed-changing hydraulic pressure circuit and a lubricating-hydraulic pressure circuit;
a sub-passage for connecting the sub-pump to the lubricating-hydraulic pressure circuit;
a regulator that opens when the hydraulic pressure of hydraulic oil supplied to the speed-changing hydraulic pressure circuit through the main passages increases, controls the amount of hydraulic oil supplied to the lubricating-hydraulic pressure circuit through the main passage and the sub-passage, and adjusts the hydraulic pressure of hydraulic oil supplied to the speed-changing hydraulic pressure circuit;
a bypass passage for connecting, to each other, a section of the main passage located upstream of a location where the speed-changing hydraulic pressure circuit is connected and a section of the sub-passage located upstream of the regulator;
a check valve that is provided in the bypass passage and permits only flow of hydraulic oil in a direction from the sub-passage toward the main passage, wherein the check valve closes when discharge performance of the main pump increases, and supply paths for hydraulic oil discharged from the sub-pump are automatically switched in accordance with the discharge performance of the main pump; and a switch-over valve provided at a section of the sub-passage located downstream of a location where the bypass passage is connected and located upstream of the regulator, and the switch-over valve is configured to be capable of being switched between a first state, where a section of the sub-passage located upstream of the switch-over valve is brought into communication with a section of the main passage located upstream of a location where the speed-changing hydraulic pressure circuit is connected, and a second state, where the section of the sub-passage located upstream of the switch-over valve is brought into communication with a section of the sub-passage located downstream of the switch-over valve, wherein the switch-over valve is switched to the first state before the supply paths for hydraulic oil discharged from the sub-pump are automatically switched in accordance with the discharge performance of the main pump.

11. The hydraulic device for a stepless transmission according to 10, wherein the switch-over valve is switched to the first state when operation of an accelerator operating member of a vehicle provided with the stepless transmission is released.

12. The hydraulic device for a stepless transmission according to claim 10, wherein the switch-over valve is switched to the first state when a brake operating member of a vehicle provided with the stepless transmission is operated.

13. The hydraulic device for a stepless transmission according to claim 10, wherein the switch-over valve is switched to the first state when an operation amount of an accelerator operating member of a vehicle provided with the stepless transmission becomes equal to or greater than a reference operation amount.

14. The hydraulic device for a stepless transmission according to claim 10, wherein the stepless transmission includes, as a speed-changing control mode, a sequential mode for selecting one of a plurality of transmission gears having different transmission gear ratios, and when the speed-changing control mode is switched to the sequential mode, the switch-over valve is switched to the first state.

15. The hydraulic device for a stepless transmission according to claim 10, wherein the stepless transmission includes, as speed-changing control modes, a normal mode and a sport mode having a transmission gear ratio greater than that of the normal mode, and the switch-over valve is switched to the first state when the speed-changing control mode is switched to the sport mode.

16. The hydraulic device for a stepless transmission according to claim 10, wherein the switch-over valve is switched to the first state when a brake operating member of a vehicle provided with the stepless transmission is operated and locking of wheels is detected.

17. The hydraulic device for a stepless transmission according to claim 10, wherein the stepless transmission further includes a forward/reverse switching mechanism having a clutch, and a lockup clutch, the hydraulic device further comprises:

a clutch-apply control valve that switches between supply paths for hydraulic oil supplied to the clutch of the forward/reverse switching mechanism;

a first solenoid that outputs a control hydraulic pressure for driving the clutch-apply control valve to a garage operating position;

a lockup relay valve that switches between supply paths for hydraulic oil supplied to the lockup clutch; and a second solenoid that outputs a control hydraulic pressure for driving the lockup relay valve to a lockup engaging operating position, and wherein a control hydraulic pressure that is output from the second solenoid is input to the clutch-apply control valve so that when a control hydraulic pressure is output from the second solenoid, the clutch-apply control valve is not displaced to the garage operating position even if a control hydraulic pressure is output from the first solenoid, both a control hydraulic pressure that is output from the first solenoid and a control hydraulic pressure that is output from the second solenoid are input to the switch-over valve, the switch-over valve is switched to the second state when control hydraulic pressures are output from both the first solenoid and the second solenoid, and the switch-over valve is switched to the first state when the control hydraulic pressure is not output from the first solenoid.

18. The hydraulic device for a stepless transmission according to claim 10, further comprising a first linear solenoid that increases a control hydraulic pressure output therefrom when increasing a belt pinching pressure of the stepless transmission, wherein as a control hydraulic pressure that is output from the first linear solenoid increases, the belt pinching pressure increases, and by a control hydraulic pressure that is output from the first linear solenoid, the switch-over valve is driven such that the switch-over valve is switched to the first state.

19. The hydraulic device for a stepless transmission according to claim 9, wherein the stepless transmission includes a secondary pulley that adjusts the belt pinching pressure, the hydraulic device further includes a pressure modulator that controls the hydraulic pressure of hydraulic oil supplied to the secondary pulley, and the first linear solenoid is a belt pinching pressure controlling-linear solenoid that outputs a control hydraulic pressure for biasing the pressure modulator to its opening side.

20. The hydraulic device for a stepless transmission according to claim 9, wherein the first linear solenoid is a line pressure controlling-linear solenoid that outputs a control hydraulic pressure for biasing the regulator to its closing side.

21. The hydraulic device for a stepless transmission according to claim 9, wherein the hydraulic pressure of hydraulic oil supplied to the primary pulley of the stepless transmission is applied to the switch-over valve such that the switch-over valve is driven in a direction opposite to a direction in which the switch-over valve is driven by a control hydraulic pressure that is output from the first linear solenoid.

22. The hydraulic device for a stepless transmission according to claim 9, further comprising a speed-changing controlling-linear solenoid that outputs a control hydraulic pressure for controlling the hydraulic pressure of hydraulic oil supplied to the primary pulley of the stepless transmission, wherein a control hydraulic pressure that is output from the speed-changing controlling-linear solenoid is applied to the switch-over valve such that the switch-over valve is driven in a direction opposite to a direction in which the switch-over valve is driven by a control hydraulic pressure that is output from the first linear solenoid.

23. The hydraulic device for a stepless transmission according to claim 18, wherein the stepless transmission includes a secondary pulley that adjusts the belt pinching pressure, the hydraulic device further includes a pressure modulator that controls the hydraulic pressure of hydraulic oil supplied to the secondary pulley, and the first linear solenoid is a belt pinching pressure controlling-linear solenoid that outputs a control hydraulic pressure for biasing the pressure modulator to its opening side.

24. The hydraulic device for a stepless transmission according to claim 18, wherein the first linear solenoid is a line pressure controlling-linear solenoid that outputs a control hydraulic pressure for biasing the regulator to its closing side.

25. The hydraulic device for a stepless transmission according to claim 18, wherein the hydraulic pressure of hydraulic oil supplied to the primary pulley of the stepless transmission is applied to the switch-over valve such that the switch-over valve is driven in a direction opposite to a direction in which the switch-over valve is driven by a control hydraulic pressure that is output from the first linear solenoid.

26. The hydraulic device for a stepless transmission according to claim 18, further comprising a speed-changing controlling-linear solenoid that outputs a control hydraulic pressure for controlling the hydraulic pressure of hydraulic oil supplied to the primary pulley of the stepless transmission, wherein a control hydraulic pressure that is output from the speed-changing controlling-linear solenoid is applied to the switch-over valve such that the switch-over valve is driven in a direction opposite to a direction in which the switch-over valve is driven by a control hydraulic pressure that is output from the first linear solenoid.

* * * * *